US012512975B2

(12) United States Patent
Stapleton et al.

(10) Patent No.: US 12,512,975 B2
(45) Date of Patent: Dec. 30, 2025

(54) SYSTEMS AND METHODS FOR ESTABLISHING CRYPTOGRAPHIC KEYS SHARED AMONG THREE OR MORE DEVICES

(71) Applicant: Wells Fargo Bank, N.A., San Francisco, CA (US)

(72) Inventors: Jeff J. Stapleton, O'Fallon, MO (US); Richard Toohey, Burlington, VT (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 232 days.

(21) Appl. No.: 18/464,850

(22) Filed: Sep. 11, 2023

(65) Prior Publication Data

US 2025/0088355 A1    Mar. 13, 2025

(51) Int. Cl.
*H04L 9/08* (2006.01)

(52) U.S. Cl.
CPC .......... *H04L 9/0861* (2013.01); *H04L 9/0852* (2013.01)

(58) Field of Classification Search
CPC .......................... H04L 9/0861; H04L 9/0852
See application file for complete search history.

(56) References Cited

U.S. PATENT DOCUMENTS

| | | | |
|---|---|---|---|
| 7,359,512 B1 * | 4/2008 | Elliott | H04L 9/0858 380/263 |
| 8,934,629 B2 | 1/2015 | Hamachi | |
| 2014/0181522 A1 * | 6/2014 | Tanizawa | H04L 63/06 713/171 |
| 2017/0163415 A1 * | 6/2017 | Gray | H04L 9/0852 |
| 2017/0237558 A1 * | 8/2017 | Yuan | H04L 9/12 380/279 |

(Continued)

FOREIGN PATENT DOCUMENTS

| | | | | |
|---|---|---|---|---|
| EP | 4462727 A1 * | 11/2024 | | H04B 10/70 |
| GB | 2630594 A * | 12/2024 | | H04L 9/0861 |

(Continued)

OTHER PUBLICATIONS

"Xiu-Bo Chen", "Gang Xu", "Xin-Xin-Nu", "Qiao-Yan, Wen", "Yi-Xian Yang", "An efficient protocol for the private comparison of equal information based on the triplet entangled state and single-particle measurement" (Year: 2009).*

(Continued)

*Primary Examiner* — Darshan I Dhruv
(74) *Attorney, Agent, or Firm* — K&L Gates LLP

(57) ABSTRACT

Systems, apparatuses, methods, and computer program products are disclosed for establishing cryptographic keys shared among three or more devices. An example method includes generating a set of particles and an entangled particle triplet based on the set of particles. The example method further includes transmitting the first set of entangled particles to a first host device, the second set of entangled particles to a second host device, and the third set of entangled particles to a third host device, and making a determination whether the three sets of bits are matching, where the three sets of bits are derived from the three sets of entangled particles sent to the three host devices. The example method further includes establishing the cryptographic keys based on the matching sets of bits.

20 Claims, 17 Drawing Sheets

(56) References Cited

U.S. PATENT DOCUMENTS

| | | | | |
|---|---|---|---|---|
| 2020/0403787 A1* | 12/2020 | Islam | ................... | H04L 9/0852 |
| 2021/0152327 A1* | 5/2021 | Givental | ............... | H04L 9/0618 |
| 2022/0094442 A1* | 3/2022 | Isaacson | ............... | G06N 10/00 |
| 2023/0014894 A1 | 1/2023 | M M et al. | | |
| 2024/0106637 A1* | 3/2024 | Yeomans | ................ | H04L 45/42 |
| 2024/0113870 A1 | 4/2024 | Alshowkan et al. | | |
| 2024/0204999 A1* | 6/2024 | Tong | ...................... | G06F 21/62 |

FOREIGN PATENT DOCUMENTS

| | | | | |
|---|---|---|---|---|
| WO | WO-2011002412 A1 * | 1/2011 | ............... | H04L 9/00 |
| WO | WO-2023242550 A1 * | 12/2023 | ........... | H04L 9/0855 |

OTHER PUBLICATIONS

Taketa, Kenta, et al. "Quantum tomography of an entangled three-qubit state in silicon." Nature Nanotechnol. 16, 965-969 (2021).

McConnell, Robert, et al. "Entanglement with negative Wigner function of almost 3,000 atoms heralded by one photon." Nature 519, 439-442 (2015).

Deny R. Hamel, et al., Direct Generation of Three-Photon Polarization Entanglement, Apr. 28, 2014.

Bo Jing, et al., Hybrid Entanglement of Three Quantum Memoires with Three Photons, Aug. 16, 2018.

Quantum Entanglement of Three Spin Qubits Demonstrated in Silicon, Riken, Sep. 3, 2021, https://www.riken.jp/en/ews_pubs/research_news/rr/20210903_1/.

Davide Castel Vecchi, Quatum Network is Step Towards Ultrasecure Internet, Feb. 17, 2021, https://nature.com/articles/d41586-021-00420-5.

Peter Bordow et al, U.S. Appl. No. 18/168,171, filed Feb. 13, 2023.

* cited by examiner

SYSTEMS AND METHODS FOR ESTABLISHING CRYPTOGRAPHIC KEYS SHARED AMONG THREE OR MORE DEVICES

BACKGROUND

Quantum key distribution (QKD) establishes a shared symmetric key between two communicating parties. QKD protocols rely upon quantum mechanics to mitigate the risk of a man-in-the-middle attack, during which a third party eavesdrops on a transmission between parties to duplicate the shared key. Some QKD protocols (e.g., E91) use quantum entangled particles (photons) while others (e.g., BB84) use non-entangled particles (photons) but both use quantum measurement (e.g. photon polarization). An eavesdropper affects the transmission such that the receivers get different results. Results are verified typically using a second classical communications channel.

BRIEF SUMMARY

Modern communication systems may be highly distributed, increasing the need for secure device authentication during the exchange of sensitive data. One method to securely authenticate devices within a distributed system involves distribution of particles via transmission mediums (e.g., fiber optics, etc.) to a desired recipient (e.g., a device to be authenticated). Such authentication using entangled particles allows for improved communication security between devices by preventing intercepted sensitive data from being accessible to unintended recipients.

As one method for improving device authentication security within a distributed system, systems, apparatuses, methods, and computer program products are disclosed herein for establishing a secure communications channel between two or more devices using quantum entanglement. While example embodiments are shown herein that depict three-way entanglement enabling secure communication among three systems, embodiments herein allow for the generation and distribution of any number (N) of entangled particles to the same number of devices within a distributed system, within practical limits (e.g., based on photon energy and the energy of split photons derived from the initial photon). This advantageously allows for multiple devices to be authenticated while trusting a single verifying entity to secure transmission of sensitive information. For example, as a practical application of embodiments herein, N-way entanglement allows for three devices (e.g., a user device and two servers) to receive entangled particles that may be used to establish identical cryptographic keys. In the event the user device is disconnected from one of the servers, the user device is still able to securely connect to the other server, which has established an identical key. As a result, embodiments herein directly improve authentication between multiple devices and communication security in the field of network security and communications.

Methods, apparatuses, systems, and computer program products are described herein that provide for the use of entangled particles for symmetric authentication between multiple devices within a distributed system. In particular, authentication of devices in a distributed system may be challenging due to the distance between the devices and the complexity of the environment in which the devices reside.

As one improvement in device authentication security, example embodiments described herein provide for authentication between multiple devices using N-way entangled particles. N-way entanglement allows for any number (N) of entangled particles within practical limits (e.g., based on energy available from an initial photon to split into N entangled photons) to be distributed to the same number of devices within a distributed system. Devices that receive the N-way entangled particles may participate in the secure transmission of sensitive information as described below in a series of examples.

In an example embodiment, authentication between multiple devices may facilitate completion of a failover process in the event a connection between two or more of the authenticated devices cannot be established or maintained (e.g., lost, disconnected, terminated, etc.). The connection may not be established or maintained due to, for example, network disruptions, device hardware or software errors, external issues (e.g., sunspots, electromagnetic pulses (EMPs), or the like), and/or other factors. To facilitate the failover process, the N-way entangled particles may be distributed to a device, a first server, and a second server. The device may attempt to establish a secure connection to the first server. An error may occur with the connection request (e.g., the connection request may time out, may receive an error code in response, and/or an existing connection to the first server may be lost). Rather than waiting to establish a new connection with the disconnected first server and/or distributing a new key to the device and first server (e.g., via additional entangled particles), the device may instead attempt to connect to the second server. By distributing entangled particles to multiple devices, secure connections may be maintained without requiring distribution of a new key (i.e., the initially distributed key is also held by the second server and thus may still be used to authenticate the device).

In another example embodiment, N-way entangled particles may be distributed to any number of devices to facilitate secure group messaging. For example, one device may broadcast a message and multiple devices may receive and decode the message. The message may be encoded using at least a portion of a key derived from the entangled particles, a message authentication code (MAC), or both (cipher-based message authentication code (CMAC)). This way, all devices provided with the key using the N-way entangled particles will be able to decode the message while devices not provided with the N-way entangled particles will not be able to decode the message. For example, a third-party device attempting to intercept the broadcasted message may not be able to decode the message, as the third-party device was not provided with the N-way entangled particles containing the key.

In another example embodiment, N-way entangled particles may be distributed to multiple devices, one of which may be located in a demilitarized zone (DMZ) communications network between a public network and a private network. By doing so, a first device in the public network may transmit secure messages to a third device inside the private network via a second device disposed within the DMZ network. The second device within the DMZ network may confirm that the first and second device have permission to communicate (e.g., have both received entangled particles and, therefore, a shared key) prior to forwarding the message to the third device within the private portion.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" or "host device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
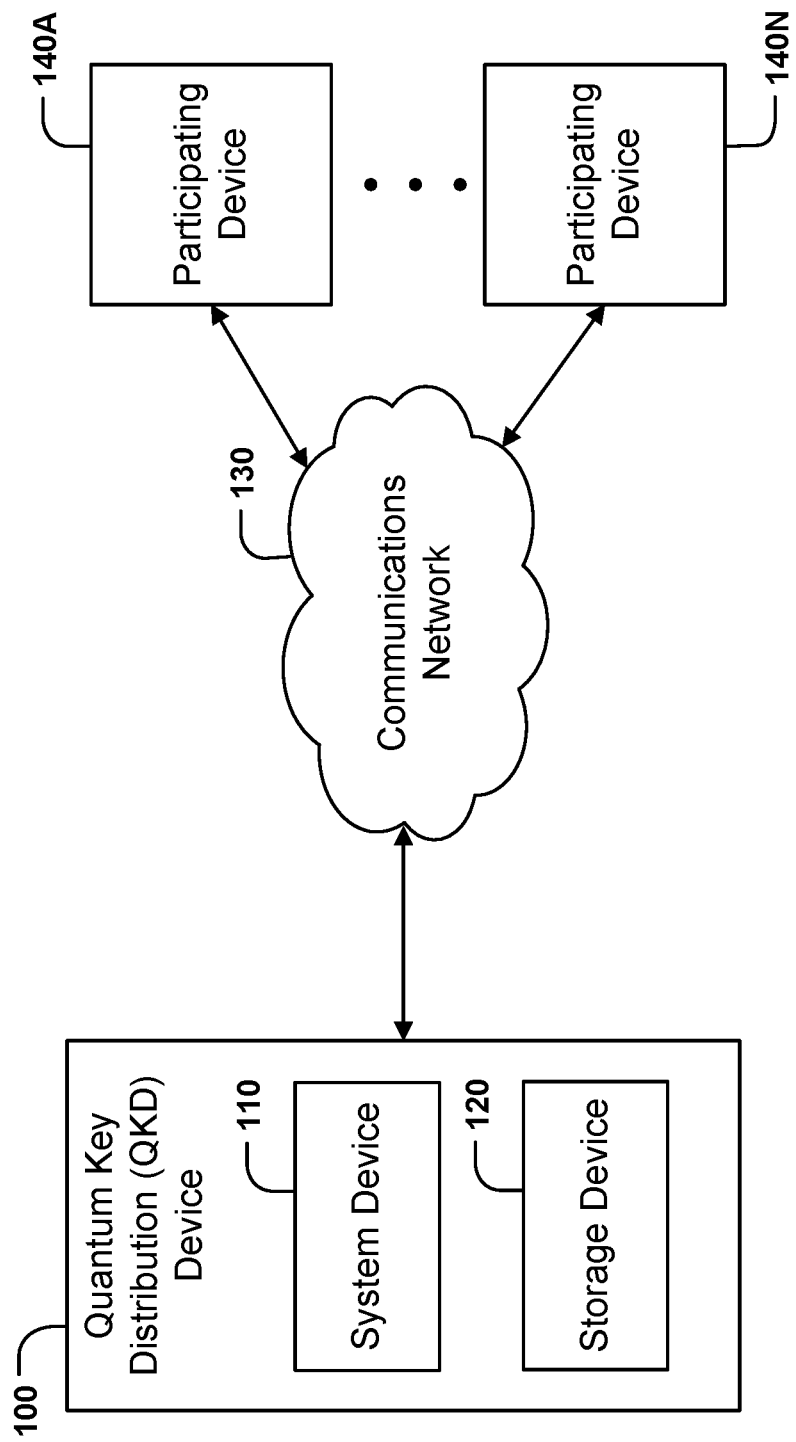
FIG. 1 illustrates a system in which some example embodiments may be used for establishing shared cryptographic keys by symmetric authentication of three devices using entangled quantum particles.

Example embodiments described herein may be implemented using any of a variety of computing devices or servers. To this end, FIG. 1 illustrates an example environment 100 within which various embodiments may operate. As illustrated, a symmetric qubit authentication trisection system 102 may receive and/or transmit information via communications network 104 (e.g., the Internet) with any number of other devices, such as a host device 106 through host device 110.

The symmetric qubit authentication trisection system 102 may be implemented as one or more computing devices or servers, which may be composed of a series of components. Particular components of the symmetric qubit authentication trisection system 102 are described in greater detail below with reference to apparatus 200 in connection with FIG. 2.

The host device 106, host device 108, and host device 110 may be embodied by any computing devices known in the art. Although three host devices 106 through 110 are depicted in FIG. 1, in some embodiments other configurations including different numbers of each device (e.g. different multiples of host device 106) may be connected via communications network 104. The host devices 106-110 need not themselves be independent devices, but may be peripheral devices communicatively coupled to other computing devices.

Although host device 106, host device 108, and host device 110 are identified as three distinct hosts, it will be understood that the example embodiments described herein depict three hosts to simplify the explanation of certain embodiments, but any number of hosts may be used by extending some of the embodiments described herein. The host device 108 and host device 110 may be identified as "Alice" and "Bob" in the canonical naming scheme for example cryptographic operations, while host device 106 may be identified as "Victor," or a "verifier" host. A hypothetical attacker or eavesdropper may be identified as "Eve" in the descriptions herein.

Although FIG. 1 illustrates an environment and implementation in which the symmetric qubit authentication trisection system 102 interacts indirectly with a user via one or more of host devices 106-110, in some embodiments users may directly interact with the symmetric qubit authentication trisection system 102 (e.g., via communications hardware of the symmetric qubit authentication trisection system 102), in which case a separate host device 106 may not be utilized. A user may interact directly with the symmetric qubit authentication trisection system 102, for example, as a failsafe access method. A user may also directly interact with the symmetric qubit authentication trisection system 102 for maintenance or initial configuration, though the symmetric qubit authentication trisection system 102 may, in some embodiments, be capable of performing each of its functions via direct interaction. Whether by way of direct interaction or indirect interaction via another device, a user may communicate with, operate, control, modify, or otherwise interact with the symmetric qubit authentication trisection system 102 to perform the various functions and achieve the various benefits described herein.

Example Implementing Apparatuses

Figure 2A:
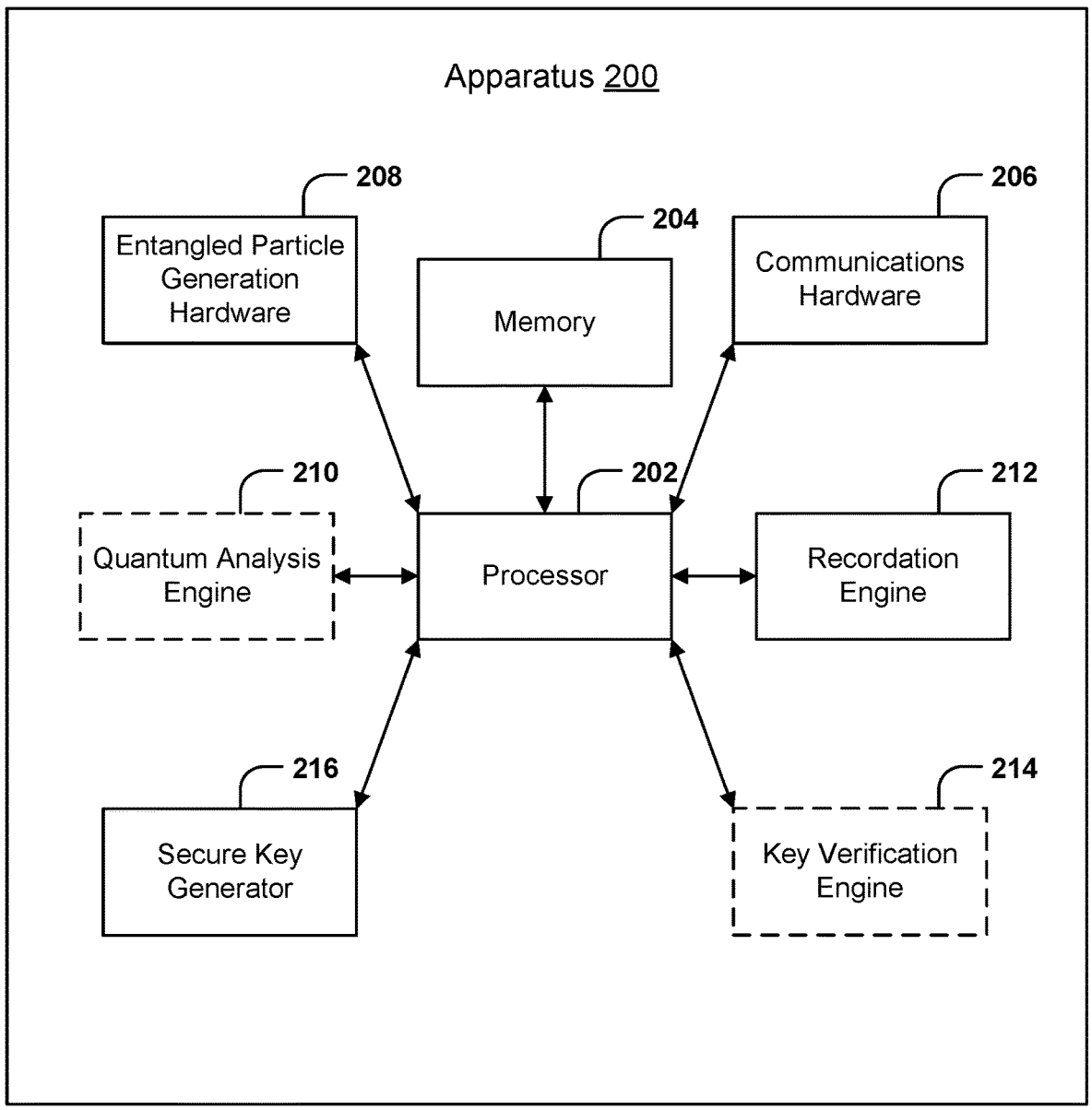
FIG. 2 illustrates a schematic block diagram of example circuitry embodying a system device that may perform various operations in accordance with some example embodiments described herein.
Figure 2B:
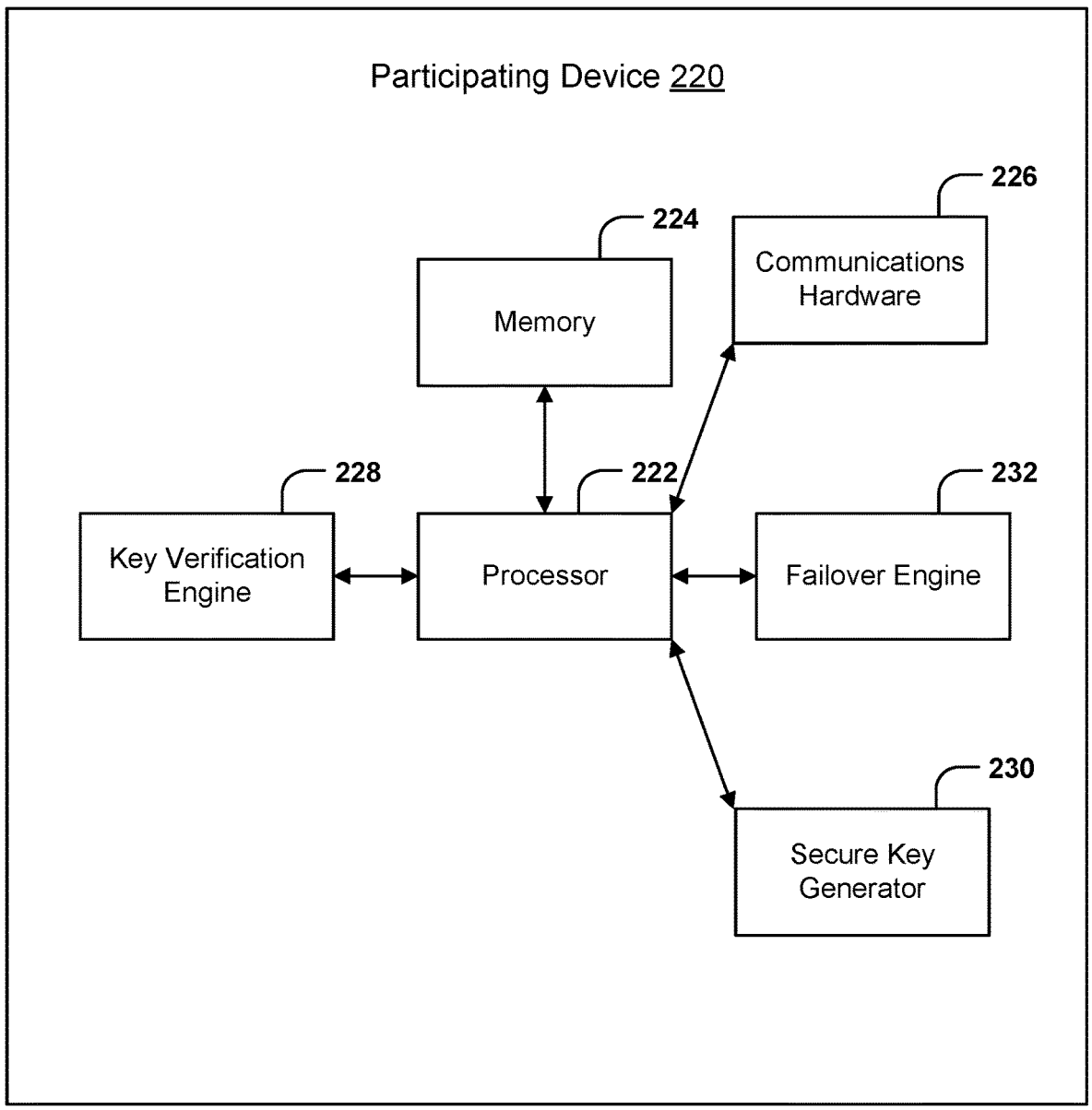

The symmetric qubit authentication trisection system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, particle generator circuitry 208, quantum trisection circuitry 210, quantum communications channel 212, cryptographic circuitry 214, and hardware security module 216, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may include a user interface, such as a display, and may further include the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further includes a particle generator circuitry 208 that generates quantum particles (e.g., photons or electrons). For example, the particle generator circuitry 208 may be a laser that provides a steady stream of photons for subsequent use by other circuitry of the apparatus 200. Particles may be polarized or unpolarized depending on the implementation. The particle generator circuitry 208 may utilize processor 202, or other hardware components included in the apparatus 200 in the course of generating quantum particles. The particle generator circuitry 208 may further utilize communications hardware 206 to gather data from a variety of sources (e.g., host devices 106 as shown in FIG. 1), and/or exchange data with a user, and in some embodiments may utilize processor 202 and/or memory 204 to generate sets of particles.

In addition, the apparatus 200 further includes a quantum trisection circuitry 210 that generates an entangled particle triplet. The quantum trisection circuitry 210 may utilize processor 202, memory 204, or any other hardware component included in the apparatus 200 to perform these operations, as described in connection with FIGS. 3-8 below. The quantum trisection circuitry 210 may further utilize communications hardware 206 to gather data from a variety of sources (e.g., host device 106 as shown in FIG. 1), and/or exchange data with a user, and in some embodiments may utilize processor 202 and/or memory 204 to generate an entangled particle triplet.

In addition, the apparatus 200 further includes a quantum communications channel 212 by which an entangled quantum particle is transmitted to a host device. The quantum communications channel 212 may utilize processor 202, memory 204, or any other hardware component included in the apparatus 200 to perform these operations, as described in connection with FIGS. 3-8 below. The quantum communications channel may include relevant hardware for physical transmission of particles, including transmission lines, and hardware for transcoding signals, and sending or receiving transmissions. The quantum communications channel 212 and its associated hardware may further utilize communications hardware 206 to gather data from a variety of sources (e.g., host device 106 as shown in FIG. 1), and/or exchange data with a user, and in some embodiments may utilize processor 202 and/or memory 204 to allow for the transmission of an entangled quantum particle.

In addition, the apparatus 200 further includes a cryptographic circuitry 214 that determines whether sets of bits are matching and establishes secure communications based on matching bits. The cryptographic circuitry 214 may utilize processor 202, memory 204, or any other hardware component included in the apparatus 200 to perform these operations, as described in connection with FIGS. 3-8 below. The cryptographic circuitry 214 may further utilize communications hardware 206 to gather data from a variety of sources (e.g., host device 106 as shown in FIG. 1), and/or exchange data with a user, and in some embodiments may utilize processor 202 and/or memory 204 to establish secure communication based on matching sets of bits.

In addition, the apparatus 200 further may include a hardware security module 216 that safeguards and manages cryptographic secret information. The hardware security module 216 may, include the particle generator circuitry 208, and quantum trisection circuitry 210, and the cryptographic circuitry 214. The hardware security module 216 may utilize processor 202, memory 204, or any other hardware component included in the apparatus 200 to perform these operations, as described in connection with FIGS. 3-8 below. The hardware security module 216 may further utilize communications hardware 206 to gather data from a variety of sources (e.g., host device 106 as shown in FIG. 1), and/or exchange data with a user, and in some embodiments may utilize processor 202 and/or memory 204 to safeguard cryptographic secrets.

In some embodiments, a hardware security module (e.g. hardware security module 216) includes the particle generator circuitry 208, the quantum trisection circuitry 210, and/or the cryptographic circuitry 214. The hardware security module may be a specialized component for safeguarding cryptographic secrets, performing cryptographic primitive operations, and the like. The hardware security module 216 may provide a secure, controlled, tamper-proof (and/or tamper-evident) computing environment for cryptographic operations, including those performed by the particle generator circuitry 208, the quantum trisection circuitry 210, and/or the cryptographic circuitry 214. The hardware security module 216 may comprise a physical and logical secure crypto-boundary, which may embody one or more secure cryptoprocessor chips. The hardware security module 216 may be evaluated by an organization or agency (e.g., the NIST Cryptographic Module Validation Program, CMVP) to conform to certain cryptographic and general security standards. In some embodiments, the quantum particle generator circuitry 208, the quantum trisection circuitry 210, and/or the cryptographic circuitry 214 may be physical components of a single hardware security module 216, or separate hardware security modules may include one or more of the circuitries.

Although components 202-216 are described in part using functional language, it will be understood that the particular implementations necessarily include the use of particular hardware. It should also be understood that certain of these components 202-216 may include similar or common hardware. For example, the particle generator circuitry 208, quantum trisection circuitry 210, quantum communications channel 212, cryptographic circuitry 214, or hardware security module 216 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the quantum particle generator circuitry 208, quantum trisection circuitry 210, quantum communications channel 212, cryptographic circuitry 214, or hardware security module 216 may leverage processor 202, memory 204, or communications hardware 206 as described above, it will be understood that any of particle generator circuitry 208, quantum trisection circuitry 210, quantum communications channel 212, cryptographic circuitry 214, or hardware security module 216 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that the particle generator circuitry 208, quantum trisection circuitry 210, quantum communications channel 212, cryptographic circuitry 214, or hardware security module 216 include particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Turning to FIGS. 3-7, example flowcharts are illustrated that contain example operations implemented by example embodiments described herein. The operations illustrated in FIGS. 3-7 may, for example, be performed the symmetric qubit authentication trisection system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, particle generator circuitry 208, quantum trisection circuitry 210, quantum communications channel 212, cryptographic circuitry 214, or hardware security module 216, and/or any combination thereof. It will be understood that user interaction with the symmetric qubit authentication trisection system 102 may occur directly via communications hardware 206, or may instead be facilitated by a separate device, and which may have similar or equivalent physical componentry facilitating such user interaction.

Figure 3A:
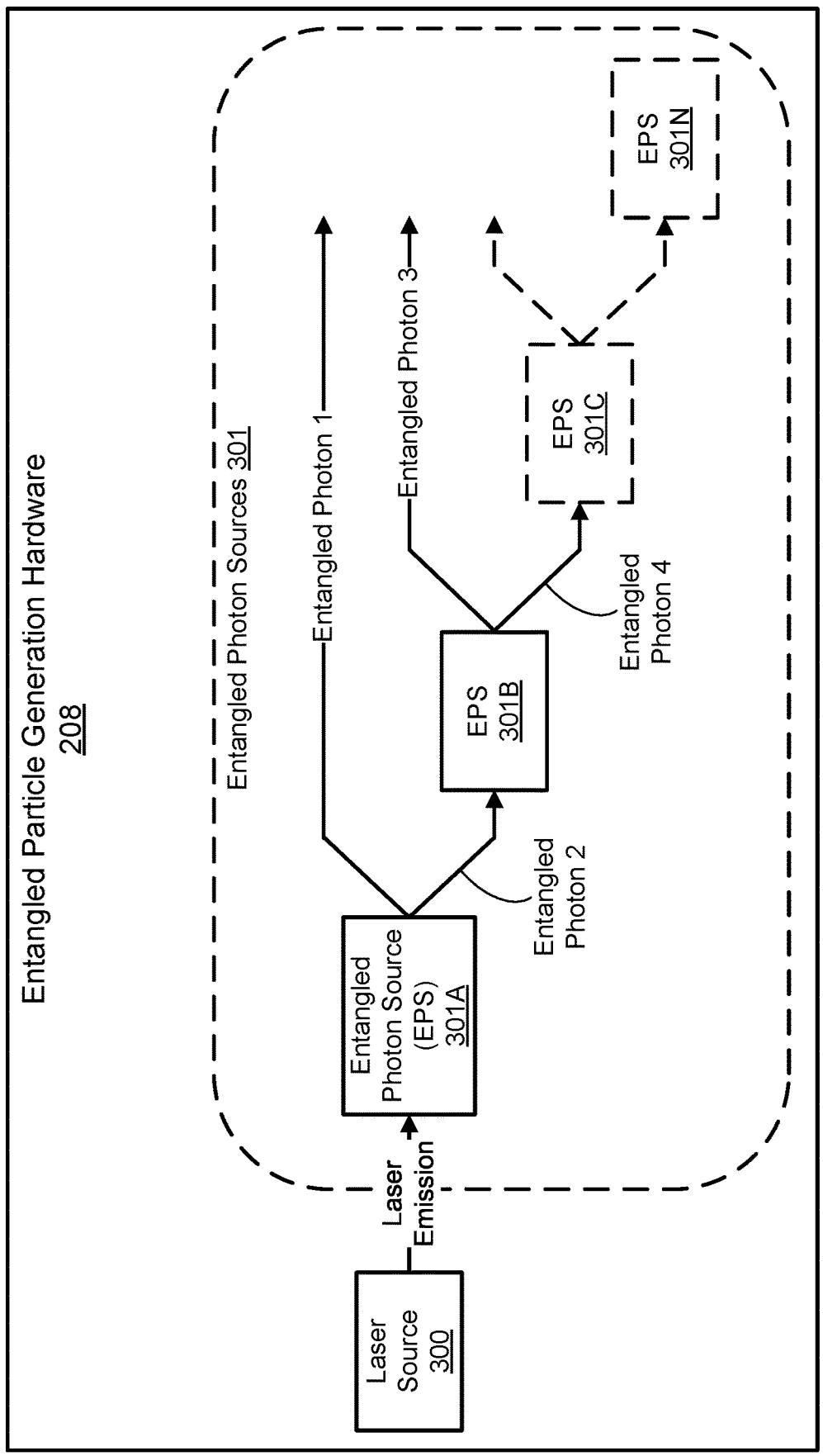
FIG. 3 illustrates an example flowchart for establishing shared cryptographic keys by symmetric authentication of two or more devices using entangled quantum particles, in accordance with some example embodiments described herein.
Figure 3B:
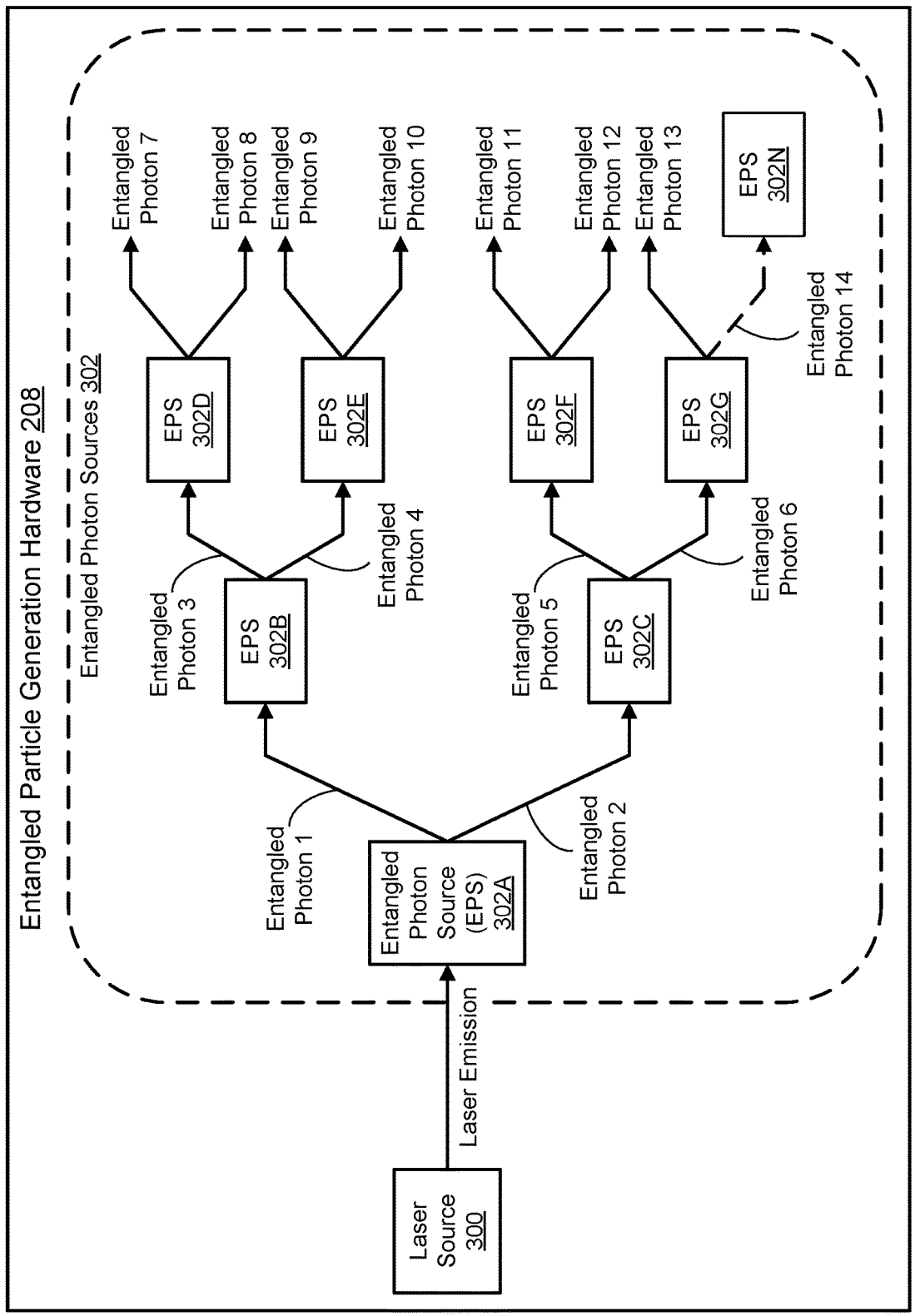

Turning first to FIG. 3, example operations are shown for establishing cryptographic keys by symmetric authentication of three or more devices using entangled quantum particles. As shown by operation 302, the apparatus 200 includes means, such as processor 202, memory 204, communications hardware 206, particle generator circuitry 208, or the like, for generating a set of particles. In some embodiments, operation 302 and operation 304 may be linked such that particles are generated in an entangled quantum state. The particle generator circuitry 208 may use any particle generation process known to the art, including electron sources, lasers, or other particle sources. The generated particles need not be polarized or prepared in any particular quantum state, as the quantum state may be set in operation 304 to the desired state.

In some embodiments, the particle generator circuitry 208 is a component of the first host device (e.g., host device 110). In embodiments in which the particle generator circuitry 208 is a component of the first host device, the symmetric qubit authentication trisection system 102 (embodied in apparatus 200) may be housed within or in close proximity to the host device 110. In some embodiments, the host device 110 may be distinct from the particle generator circuitry 208, and may be housed in a different location, either as separate computing devices or as connected devices of a single computing system.

As shown by operation 304, the apparatus 200 includes means, such as processor 202, memory 204, communications hardware 206, quantum trisection circuitry 210, or the like, for generating, based on the set of particles, a set of entangled particle triplets including a first set of entangled particles, a second set of entangled particles, and a third set of entangled particles. The sets of entangled particles may be the same particles generated in operation 302 (e.g., using a splitter or series of splitters to produce entangled particles from the stream of incoming particles), or new sets of entangled particles may be generated, having been triggered by the set of particles generated in operation 302. To simplify explanation, reference is made to generation of an entangled particle triplet (e.g., three-way entangled particles, a set of N-way entangled particles containing three (3) entangled particles). However, it should be appreciated that the quantum trisection circuitry 210 may be utilized to generate any number of particles entangled with any number of other particles (e.g., N-way entanglement). The three-way entangled particles may be generated as a single set, in a continuous stream, and/or at regular time intervals (e.g., once per second, once per minute, etc.). The quantum trisection circuitry 210 may generate the three-way entangled particles before or after establishing a connection to a participating device (e.g., host device 106). In some embodiments, in response to generating the entangled particles, the apparatus 200 may record data regarding the generation (e.g., the location, time, description, and/or the like) to storage embodied in memory 204.

In some embodiments, the quantum trisection circuitry 210 is a component of the first host device (e.g., host device 110). In embodiments in which the quantum trisection circuitry 210 is a component of the first host device, the symmetric qubit authentication trisection system 102 (embodied in apparatus 200) may be housed within or in close proximity to the host device 110. In some embodiments, the host device 110 may be distinct from the quantum trisection circuitry 210, and may be housed in a different location, either as separate computing devices or as connected devices of a single computing system. The particle generator circuitry 208 and/or quantum trisection circuitry 210 may be located together in the same device, or separately. In some embodiments, the particle generator circuitry 208 and/or quantum trisection circuitry 210 may be provided by a dedicated service, for example a third-party or cloud-based service.

As shown by operation 306, the apparatus 200 includes means, such as processor 202, memory 204, communications hardware 206, quantum communications channel 212, or the like, for transmitting the first set of entangled particles to a first host device, the second set of entangled particles to a second host device, and the third set of entangled particles to a third host device. Continuing with the above example, three sets of entangled particles may be transmitted to three participating devices (e.g., host devices 106-110) with one set of entangled particles of the three sets of entangled particles being transmitted to each of host devices 106-110 over a quantum communications channel (e.g., quantum communications channel 212). As previously mentioned, entangled particles may be generated as an individual set, in a continuous stream, and/or at previously established time intervals. Therefore, the apparatus 200 may transmit the entangled particles individually, continuously, and/or at previously established time intervals to the host devices 106-110. By doing so, apparatus 200 may transmit an arbitrarily long sequence of entangled particles to each participating device, where the length of the sequence may be selected based on the pre-determined settings (for example, based on a desired size of a secure key to be used). In some embodiments, in response to transmitting the entangled particles, the apparatus 200 may record data regarding the transmission (e.g., the location, time, description, and/or the like) to storage embodied by memory 204.

In some embodiments, the apparatus 200 may receive, via the communications hardware 206, the first set of bits from the first host device. The first set of bits may be derived from a first entangled particle by the first host device. In some embodiments, the first host device may be identified with the apparatus 200, and receiving the first set of bits may be performed trivially as the first set of bits is derived.

As shown by operation 308, the apparatus 200 includes means, such as processor 202, memory 204, communications hardware 206, cryptographic circuitry 214, or the like, for making a determination whether a first set of bits, a second set of bits, and a third set of bits are matching sets of bits, where the first set of bits is derived from the first set of entangled particles by the first host device, the second set of bits is derived from the second set of entangled particles by the second host device, and the third set of bits is derived from the third set of entangled particles by the third host device.

In some embodiments, the apparatus 200 may use means such as cryptographic circuitry 214 to make a measurement of the first set of entangled particles (e.g., when the first host device, or host device 106 is the same as or in proximity to the apparatus 200). The cryptographic circuitry 214 may determine the first set of bits based on the measurement of the first set of entangled particles. Likewise, the third host device (e.g., host device 110) may measure the third set of entangled particles and the second host device (e.g., host device 108) may measure the second set of entangled particles. The host devices 106-110 may share data regarding the generation and/or transmission of the entangled quantum particles, and may share data regarding parameters of the measurement (e.g., measurement basis) to ensure that the measurements of the entangled particles produce results that are able to produce identical bit patterns. Measuring or reading the entangled particles may collapse the entanglement and allow host devices 106-110 to obtain identical sets of bits (e.g., a first set of bits, a second set of bits, and a third set of bits) in the absence of an eavesdropper or random error.

In some embodiments, the first set of bits, the second set of bits, and the third set of bits are derived from the entangled particles using an E91 protocol. The first host device (e.g., host device 106), second host device (e.g., host device 108), and third host device (e.g., host device 110) may determine the quantum bases and other parameters used for measurements and derivation of the sets of bits as dictated by the E91 protocol. For example, the host devices may exchange classical information in addition to the exchange of entangled quantum particles for establishing cryptographic keys. The host devices may perform additional steps to check error rates of the quantum measurements and verify whether or not an eavesdropper has intercepted the quantum communications, also in accordance with the E91 protocol.

More detailed example embodiments of the determination of whether the first set of bits, the second set of bits, and the third set of bits are matching sets of bits are given in connection with FIGS. 4-6 below.

As shown by decision block 310, control may depend on the outcome of a determination of whether a first set of bits, a second set of bits, and a third set of bits are matching sets of bits. In an instance in which the first set of bits, a second set of bits, and a third set of bits are matching sets of bits (in other words, each of the three sets of bits are matching), control may pass to example operation 312, as indicated. For example, the three sets of bits may be determined to be matching by designating a subset of the bits as verification bits, as described below. By determining that the verification bits of two sets of bits are identical, the sets of bits are said to be matching. In determining that three sets of bits match, two distinct pairs of the three sets of bits may be determined to match (e.g., if A matches B and B matches C, it is determined that A, B, and C match). In another instance in which the three sets of bits are not matching, the procedure may be aborted, as the bits may not match due to an eavesdropper, poorly calibrated or misconfigured hardware, or other problems. Continuing the above example, two sets of bits may be said to not match when the verification bits from the two sets of bits are not identical.

As shown by operation 312, the apparatus 200 includes means, such as processor 202, memory 204, communications hardware 206, cryptographic circuitry 214, or the like, for, in an instance in which the first set of bits, the second set of bits, and the third set of bits are determined to be the matching set of bits, establishing a secure communications channel based on the matching set of bits. One example embodiment for establishing the secure communications channel based on the matching set of bits is given below in connection with FIG. 7. The secure communications channel may be a classical communications channel, including a channel using post-quantum cryptography (PQC), or may be non-classical. The secure communications channel may use symmetric keys or shared secrets based on the matching set of bits, or may use other methods to establish the secure communications channel.

Figure 4A:
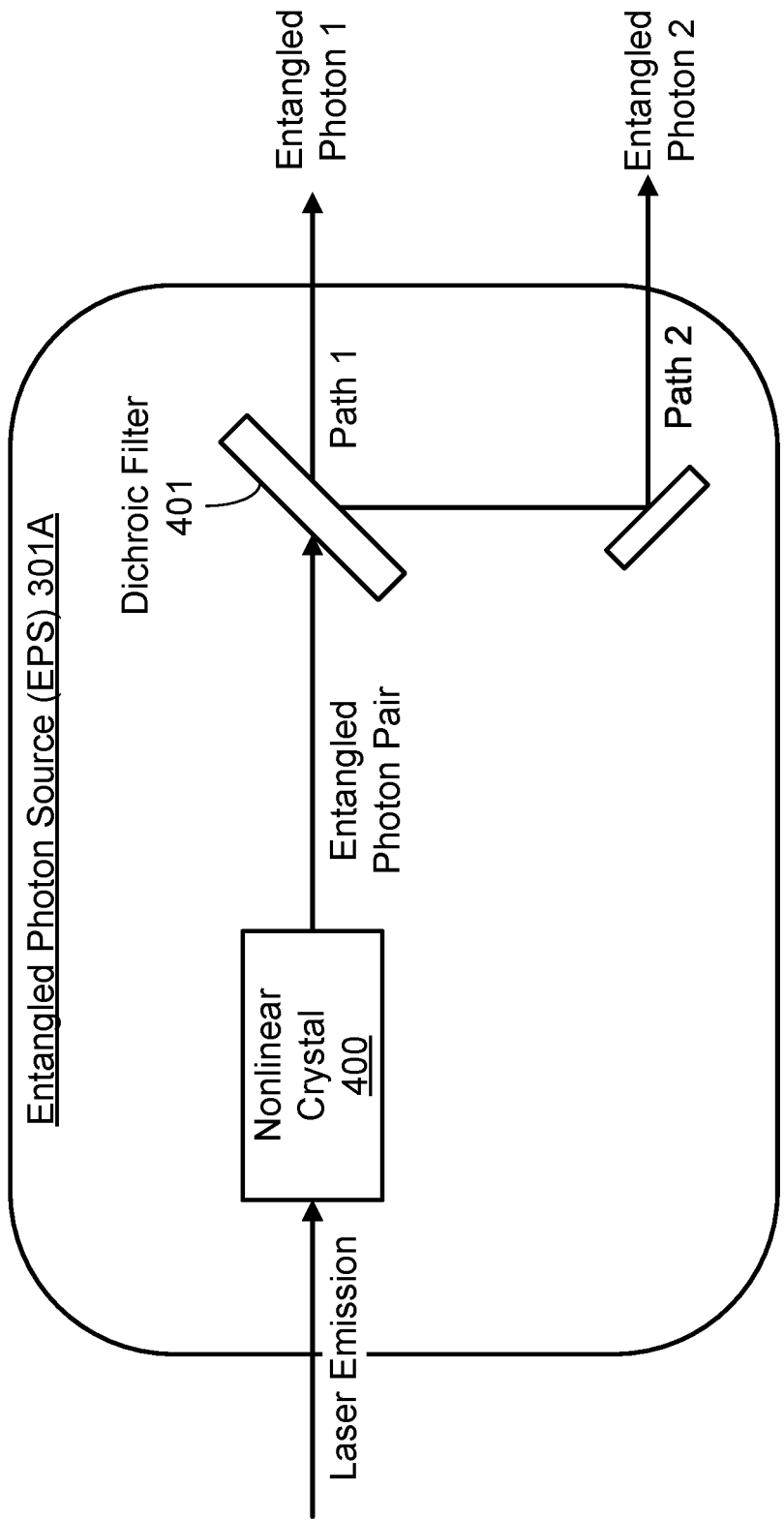
FIG. 4 illustrates an example flowchart for making a determination whether three sets of bits are matching, in accordance with some example embodiments described herein.
Figure 4B:
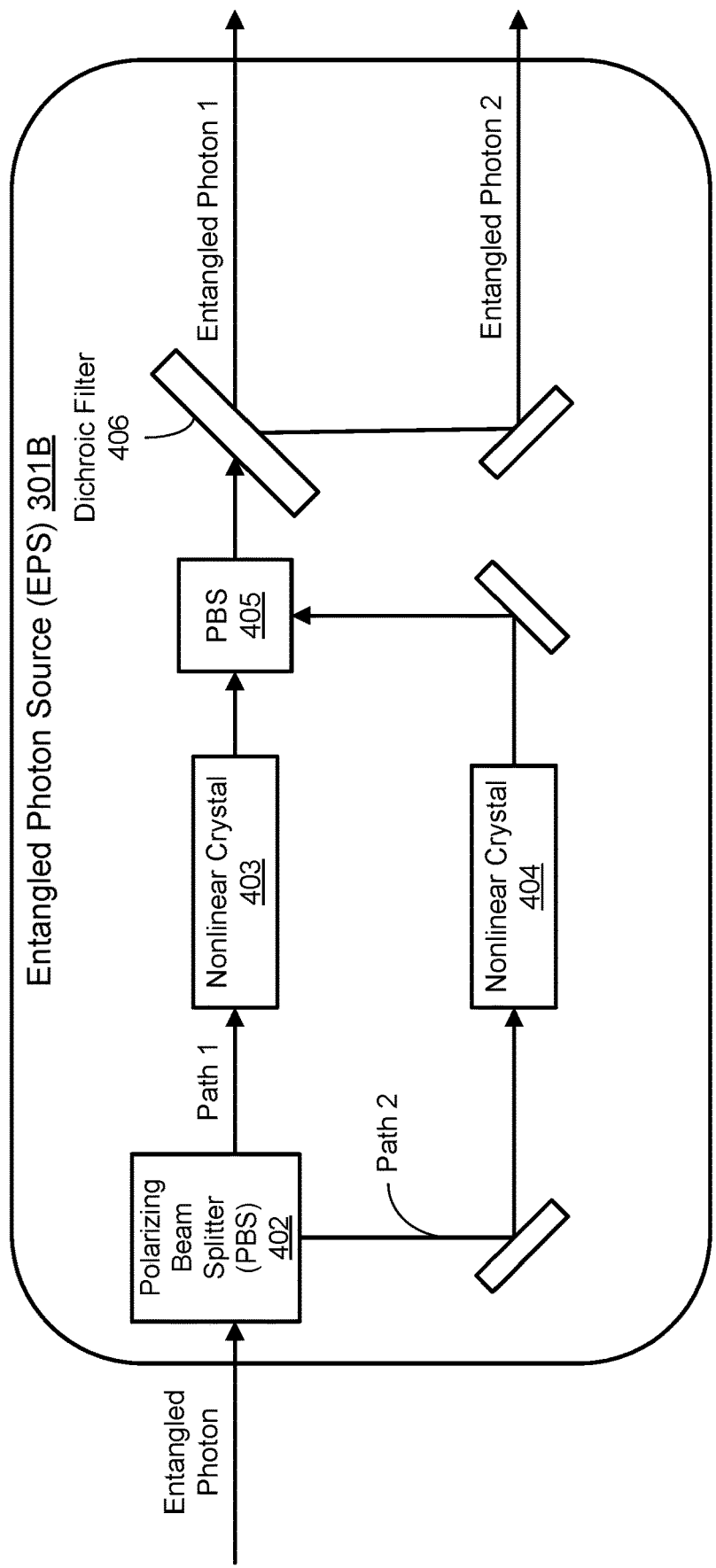
Figure 4C:
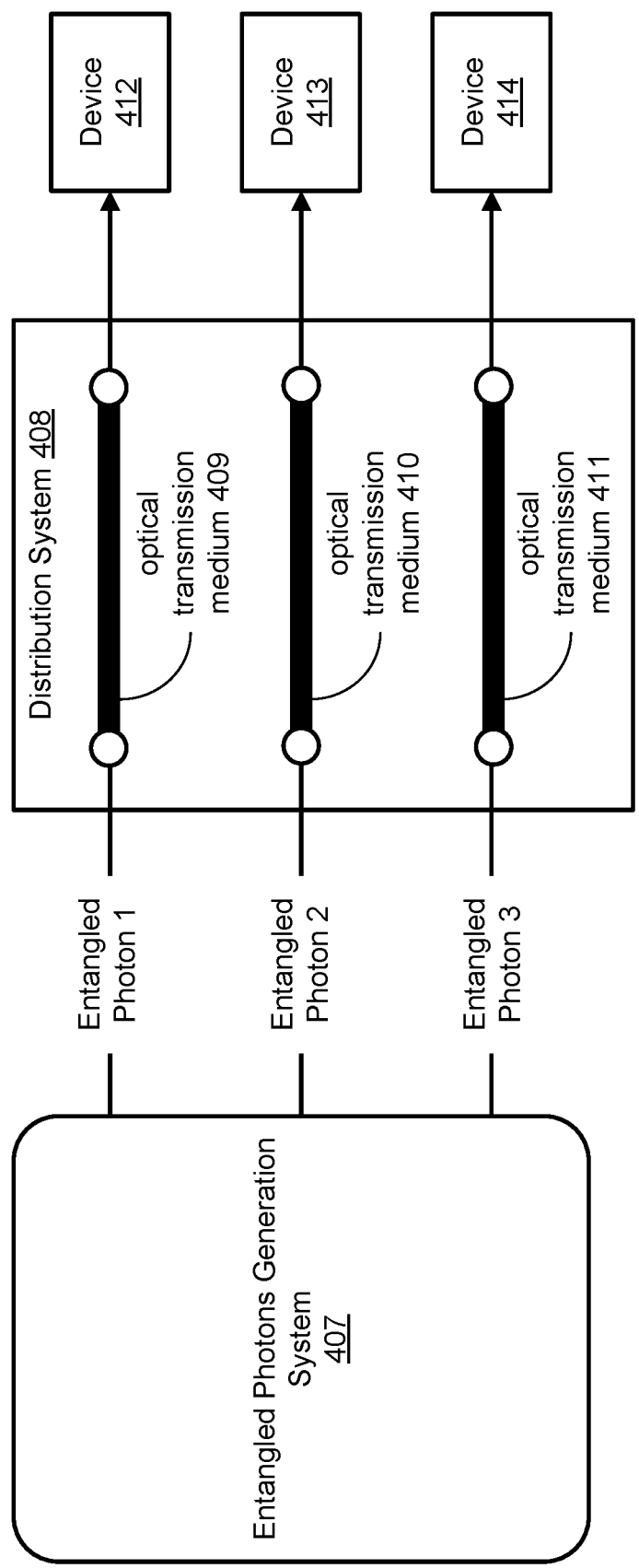

Turning next to FIG. 4, example operations are shown for making a determination whether three sets of bits are a matching set of bits. In some embodiments, the operations described in connection with example operation 308 may be implemented in the way shown in FIG. 4. As shown by operation 402, the apparatus 200 includes means, such as processor 202, memory 204, communications hardware 206, or the like, for receiving a pre-determined quantity of third bits from the third host device (e.g., host device 110), where the third set of bits includes the pre-determined quantity of third bits.

The pre-determined quantity of bits may be chosen so that the set of bits includes a subset of bits for verification and a subset of bits for establishing the cryptographic keys. The length of the set of bits and the number of pre-determined bits may be adjusted to enhance the security of the cryptographic keys and/or enhance the robustness of the verification against random error or eavesdropping. For example, a string of bits "11001100" may be derived from a particle measurement. The length of the set of bits is set to 8, and the number of verification bits may be set to 3, for example. Supposing for example that the beginning of the string of bits is used to create the subset of bits for verification, the bits corresponding to the pre-determined quantity of first bits (the verification bits) would be equal to "110," while the remaining bits "01100" would be reserved for establishing the secure communication channel.

The third host device 110 may transmit the pre-determined quantity of the third set of bits, for example, following a measurement of the third set of entangled particles. The third set of bits may be generated or derived based on the measurement of the third set of entangled particles, and a subset of the third set of bits as determined by the pre-determined quantity may be transmitted. The communications hardware 206 may receive the transmitted pre-determined quantity of third bits via a classical or quantum communications channel. In some embodiments the channel may be encrypted, using classical and/or post-quantum cryptography methods.

As shown by operation 404, the apparatus 200 includes means, such as processor 202, memory 204, communications hardware 206, or the like, for receiving a pre-determined quantity of second bits from the second host device, where the second set of bits includes the pre-determined quantity of second bits. It will be understood that the pre-determined quantity of second bits from the second host device may not be taken from the same position in the second set of bits as the third pre-determined quantity of bits was taken from the third set of bits. For example, the third host device may have the set of bits "11001100" and the pre-determined number of bits may be 3, while the beginning of the string of bits is determined to be used for verification. Then the verification bits are set to be "110", while "01100" is reserved for establishing the cryptographic keys. The second host device may also have the set of bits "11001100" and the pre-determined number of bits may be 3, while the end of the string of bits is determined to be used for verification. In the case of the second host device, the verification bits are "100", while "11001" is reserved for establishing the cryptographic keys. In this example, the bits reserved for the secure communications channel may require additional processing to reach consensus needed for finding an identical set of bits if communication is required between the third host device and second host device (e.g., communication not mediated by the first host device).

The second host device 108 may transmit the pre-determined quantity of the second set of bits, for example, following a measurement of the second set of entangled particles. The second set of bits may be generated or derived based on the measurement of the second set of entangled particles, and a subset of the second set of bits may be transmitted as determined by the pre-determined quantity of bits. The communications hardware 206 may receive the transmitted pre-determined quantity of second bits via a classical or quantum communications channel. In some embodiments the channel may be encrypted, using classical and/or post-quantum cryptography methods.

As shown by operation 406, the apparatus 200 includes means, such as processor 202, memory 204, communications hardware 206, cryptographic circuitry 214, or the like, for making a determination whether the pre-determined quantity of third bits is identical to the pre-determined quantity of second bits. The cryptographic circuitry 214 may make a straightforward comparison of the pre-determined quantity of third bits and the pre-determined quantity of second bits and determine either that the bit patterns are identical or that they are not identical.

As shown by operation 408, the apparatus 200 includes means, such as processor 202, memory 204, communications hardware 206, cryptographic circuitry 214, or the like, for making a determination whether the pre-determined quantity of third bits is identical to a pre-determined quantity of first bits, where the first set of bits includes the pre-determined quantity of first bits. The cryptographic circuitry 214 may make a straightforward comparison of the pre-determined quantity of third bits (or the pre-determined quantity of second bits, in an instance in which both sets of bits are identical) and the pre-determined quantity of first bits and determine either that the bit patterns are identical or that they are not identical.

Upon confirmation that the pre-determined quantity of first bits and the pre-determined quantity of third bits are identical, and that the pre-determined quantity of third bits and the pre-determined quantity of second bits are identical, the cryptographic circuitry 214 may conclude that the three sets of bits are matching, completing one possible implementation of operation 308.

As an additional example of the implementation of operation 308 described in FIG. 4, host device 106 and host device 108 both send a prearranged sample of random bits to host device 110, who can verify the samples match. Note this method can be done with only double entanglement without host device 108 having a copy of the random bits, but this implies host device 108 does not know the answer. But, an attacker (Eve) might spoof host device 108 and masquerade as host device 106 or host device 108, if Eve can get a copy of sample bits of host device 106 (or host device 108), thus triple quantum entanglement avoids a man-in-the-middle attacker.

Figure 5A:
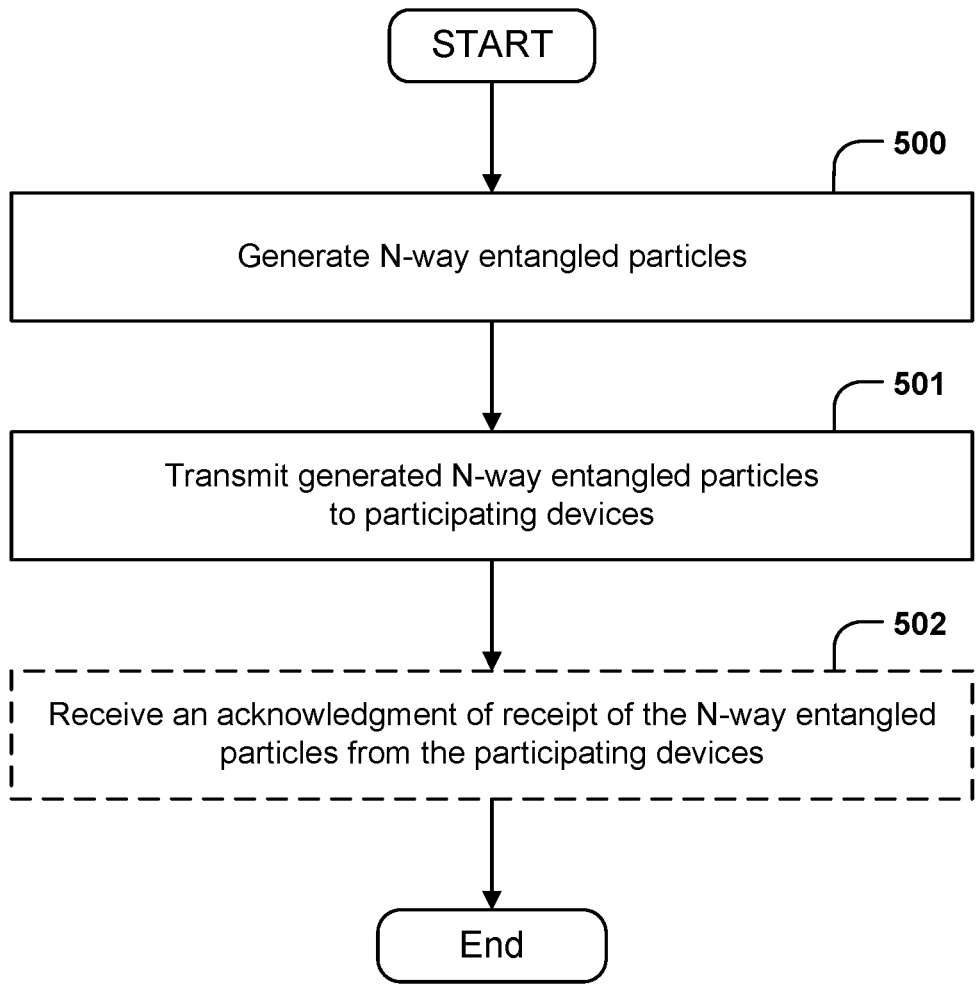
FIG. 5 illustrates another example flowchart for making a determination whether three sets of bits are matching, in accordance with some example embodiments described herein.
Figure 5B:
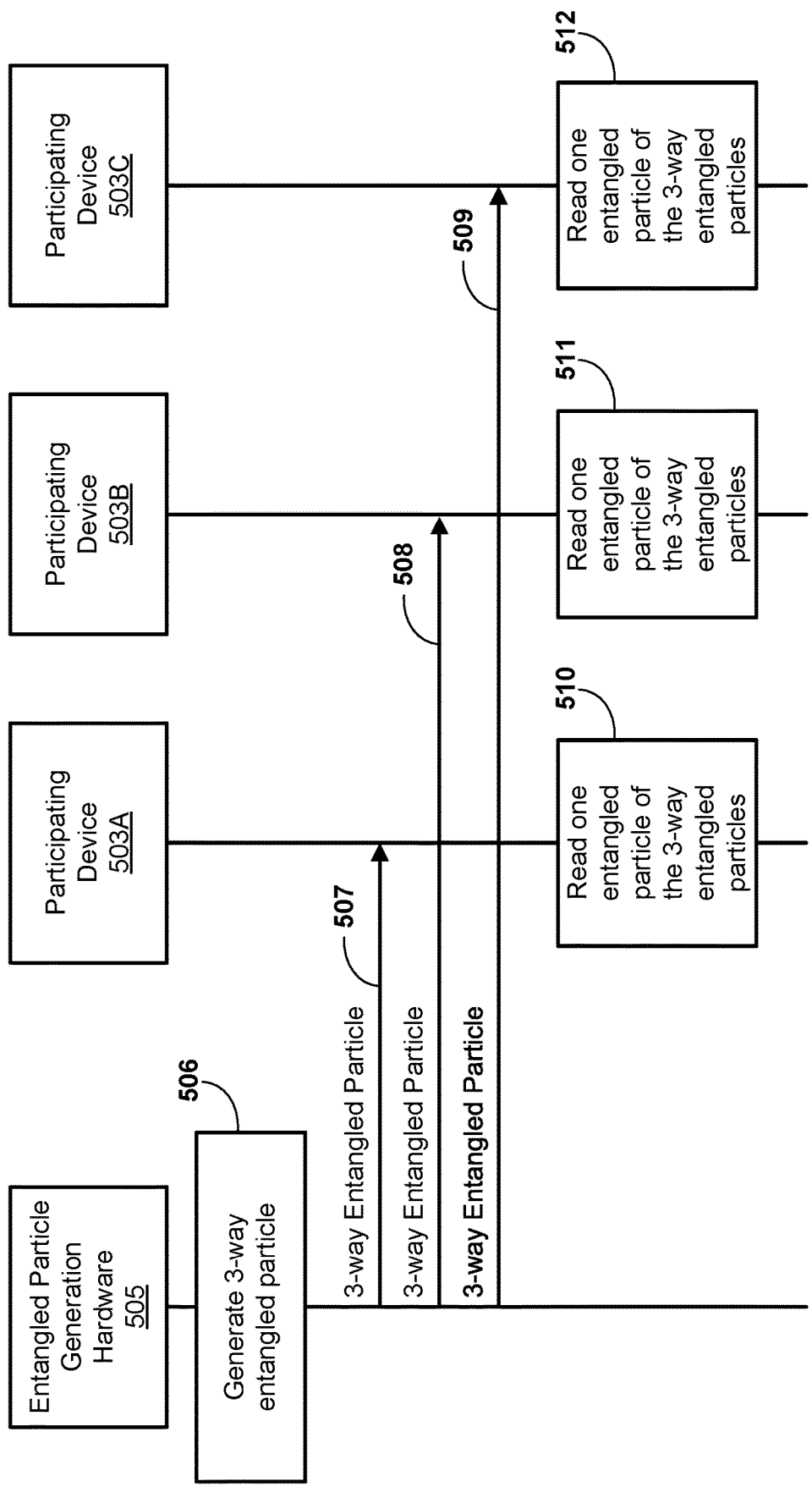

Turning next to FIG. 5, example operations are shown for making a determination whether three sets of bits are a matching set of bits. In some embodiments, the operations described in connection with example operation 308 may be implemented in the way shown in FIG. 5. As shown by operation 502, the apparatus 200 includes means, such as processor 202, memory 204, communications hardware 206, or the like, for receiving a pre-determined quantity of third bits from the third host device, where the third set of bits includes the pre-determined quantity of third bits.

The pre-determined quantity of bits may be chosen so that the set of bits includes a subset of bits for verification and a subset of bits for establishing the cryptographic keys. The length of the set of bits and the number of pre-determined bits may be adjusted to enhance the security of the cryptographic keys and/or enhance the robustness of the verification against random error or eavesdropping. For example, a string of bits "11001100" may be derived from a particle measurement. The length of the set of bits is set to 8, and the number of verification bits may be set to 3, for example. Supposing for example that the beginning of the string of bits is used to create the subset of bits for verification, the pre-determined quantity of third bits would be equal to "110," while the remaining bits "01100" would be reserved for establishing the cryptographic keys.

The third host device 110 may transmit the pre-determined quantity of the third set of bits, for example, following a measurement of the third set of entangled particles. The third set of bits may be generated or derived based on the measurement of the third set of entangled particles, and a subset of the third set of bits, as determined by the pre-determined quantity, may be transmitted. The communications hardware 206 may receive the transmitted pre-determined quantity of third bits via a classical or quantum communications channel. In some embodiments the channel may be encrypted using classical and/or post-quantum cryptography methods.

As shown by operation 504, the apparatus 200 includes means, such as processor 202, memory 204, communications hardware 206, cryptographic circuitry 214, or the like, for making a determination whether the pre-determined quantity of third bits is identical to a pre-determined quantity of first bits, where the first set of bits includes the pre-determined quantity of first bits. The cryptographic circuitry 214 may make a straightforward comparison of the pre-determined quantity of third bits and the pre-determined quantity of second bits and determine either that the bit patterns are identical or that they are not identical.

As shown by operation 506, the apparatus 200 includes means, such as processor 202, memory 204, communications hardware 206, or the like, for providing the pre-determined quantity of first bits to the second host device. The second host device 108 may receive the pre-determined quantity of the first set of bits, for example, following a measurement of the first set of entangled particles (e.g., by the first host device, host device 106). The first set of bits may be generated or derived based on the measurement of the first set of entangled particles, and a subset of the first set of bits, as determined by the pre-determined quantity, may be transmitted. The communications hardware 206 may transmit the pre-determined quantity of second bits via a classical or quantum communications channel. In some embodiments the channel may be encrypted, using classical and/or post-quantum cryptography methods.

As shown by operation 508, the apparatus 200 includes means, such as processor 202, memory 204, communications hardware 206, or the like, for receiving, from the second host device, an indication that the pre-determined quantity of first bits and a pre-determined quantity of second bits are identical, where the second set of bits includes the pre-determined quantity of second bits. The second host device 108 may transmit the indication that the pre-determined quantity second bits and pre-determined quantity of first bits are identical, for example, following a determination of the same made by the second host device (host device 108). The communications hardware 206 may receive the indication via a classical or quantum communications channel. In some embodiments the channel may be encrypted, using classical and/or post-quantum cryptography methods.

As shown by operation 510, the apparatus 200 includes means, such as processor 202, memory 204, communications hardware 206, or the like, for providing, to the third host device and second host device, an indication that the first set of bits, the second set of bits, and the third set of bits are a matching set of bits. Upon receiving confirmation that the second set of bits and the first set of bits are matching, and making the determination locally that the third set of bits and the first set of bits are matching (by using the verification bits, or the pre-determined quantity of bits), the host device 110 may conclude that all three sets of bits are matching. The communications hardware 208 may provide indication of the conclusion that the three sets of bits match to each of host device 106 and host device 108.

Figure 6A:
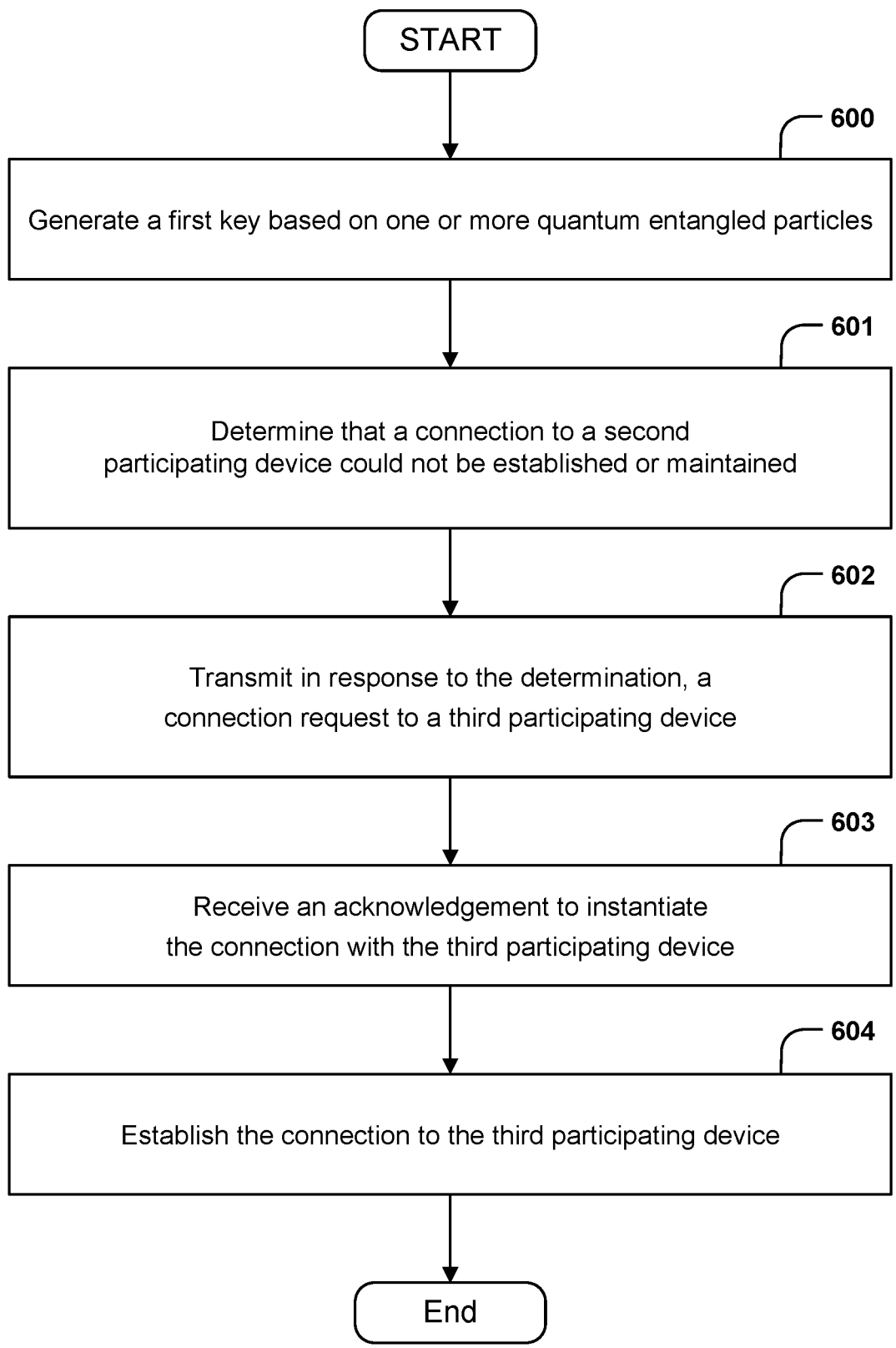
FIG. 6 illustrates another example flowchart for making a determination whether three sets of bits are matching, in accordance with some example embodiments described herein.
Figure 6B:
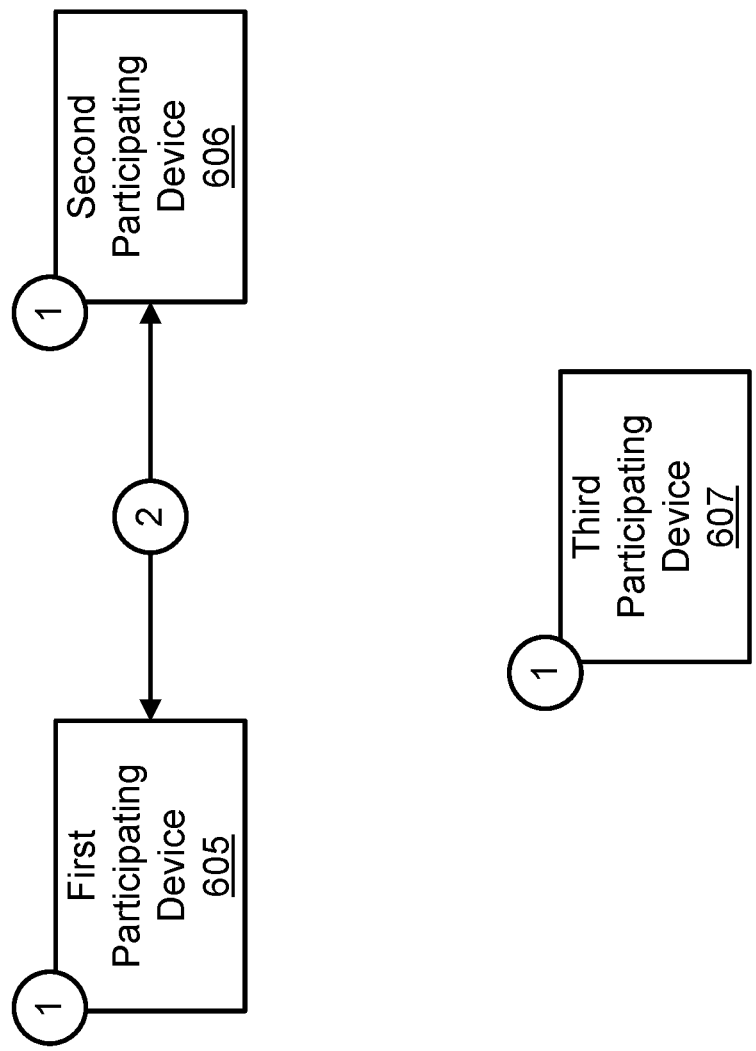
Figure 6C:
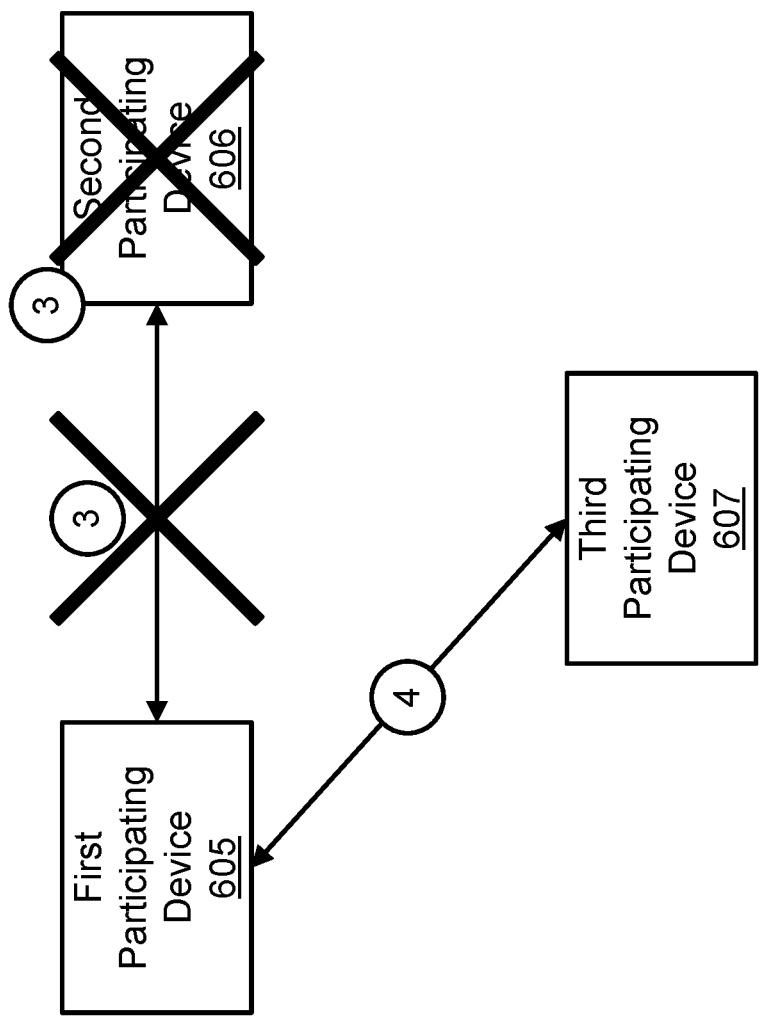

Turning next to FIG. 6, example operations are shown for making a determination whether three sets of bits are a matching set of bits. In some embodiments, the operations described in connection with example operation 308 may be implemented in the way shown in FIG. 6. As shown by operation 602, the apparatus 200 includes means, such as processor 202, memory 204, communications hardware 206, or the like, for providing a pre-determined quantity of first bits to the third host device (e.g., host device 110), where the first set of bits includes the pre-determined quantity of first bits.

The pre-determined quantity of bits may be chosen so that the set of bits includes a subset of bits for verification and a subset of bits for establishing the cryptographic keys. The length of the set of bits and the number of pre-determined bits may be adjusted to enhance the security of the cryptographic keys and/or enhance the robustness of the verification against random error or eavesdropping. For example, a string of bits "11001100" may be derived from a particle measurement. The length of the set of bits is set to 8, and the number of verification bits may be set to 3, for example. Supposing for example that the beginning of the string of bits is used to create the subset of bits for verification, the pre-determined quantity of first bits would be equal to "110," while the remaining bits "01100" would be reserved for establishing the cryptographic keys.

The third host device 110 may receive the pre-determined quantity of the first set of bits, for example, following a measurement of the first set of entangled particles (e.g., by the first host device, host device 106). The first set of bits may be generated or derived based on the measurement of the first set of entangled particles, and a subset of the first set of bits, as determined by the pre-determined quantity, may be transmitted. The communications hardware 206 may transmit the pre-determined quantity of second bits via a classical or quantum communications channel. In some embodiments the channel may be encrypted, using classical and/or post-quantum cryptography methods.

As shown by operation 604, the apparatus 200 includes means, such as processor 202, memory 204, communications hardware 206, or the like, for providing the pre-determined quantity of first bits to the second host device. The second host device 108 may receive the pre-determined quantity of the first set of bits, for example, following a measurement of the first set of entangled particles (e.g., by the first host device, host device 106). The first set of bits may be generated or derived based on the measurement of the first set entangled particles, and a subset of the first set of bits, as determined by the pre-determined quantity, may be transmitted. The communications hardware 206 may transmit the pre-determined quantity of first bits via a classical or quantum communications channel. In some embodiments the channel may be encrypted, using classical and/or post-quantum cryptography methods.

As shown by operation 606, the apparatus 200 may include means, such as processor 202, memory 204, communications hardware 206, or the like, for receiving, from the third host device, an indication that the pre-determined quantity of first bits is identical to a pre-determined quantity of third bits. The third host device 110 may transmit the indication that the pre-determined quantity of third bits and pre-determined quantity of first bits are identical, for example, following a determination of the same made by the third host device (host device 110). The communications hardware 206 may receive the indication via a classical or quantum communications channel. In some embodiments the channel may be encrypted, using classical and/or post-quantum cryptography methods.

As shown by operation 608, the apparatus 200 may include means, such as processor 202, memory 204, communications hardware 206, or the like, for receiving, from the second host device, an indication that the pre-determined quantity of first bits is identical to a pre-determined quantity of second bits. The second host device 108 may transmit the indication that the pre-determined quantity second bits and pre-determined quantity of first bits are identical, for example, following a determination of the same made by the second host device (host device 108). The communications hardware 206 may receive the indication via a classical or quantum communications channel. In some embodiments the channel may be encrypted, using classical and/or post-quantum cryptography methods.

Figure 7A:
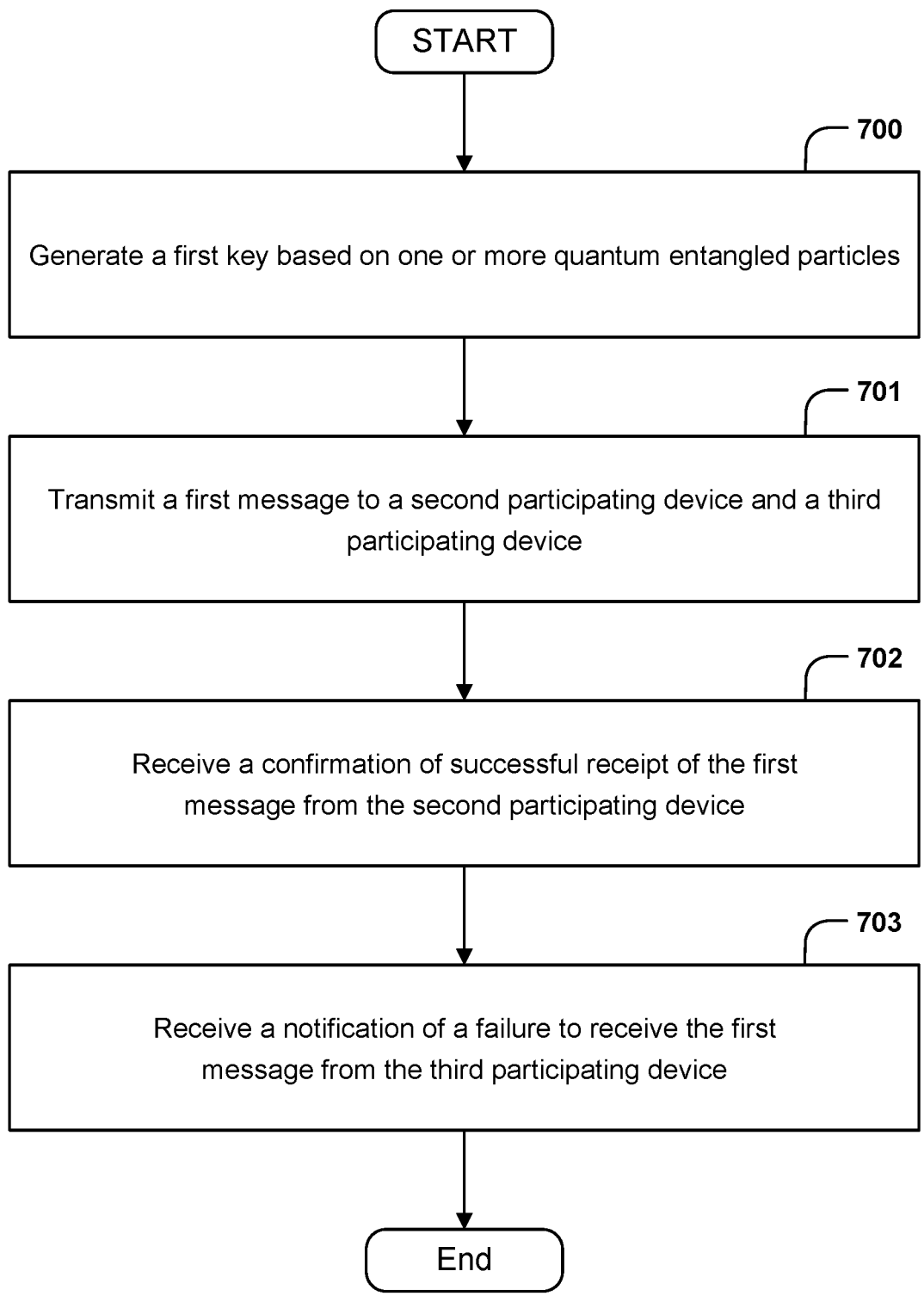
FIG. 7 illustrates another example flowchart for establishing shared cryptographic keys based on a matching set of bits, in accordance with some example embodiments described herein.
Figure 7B:
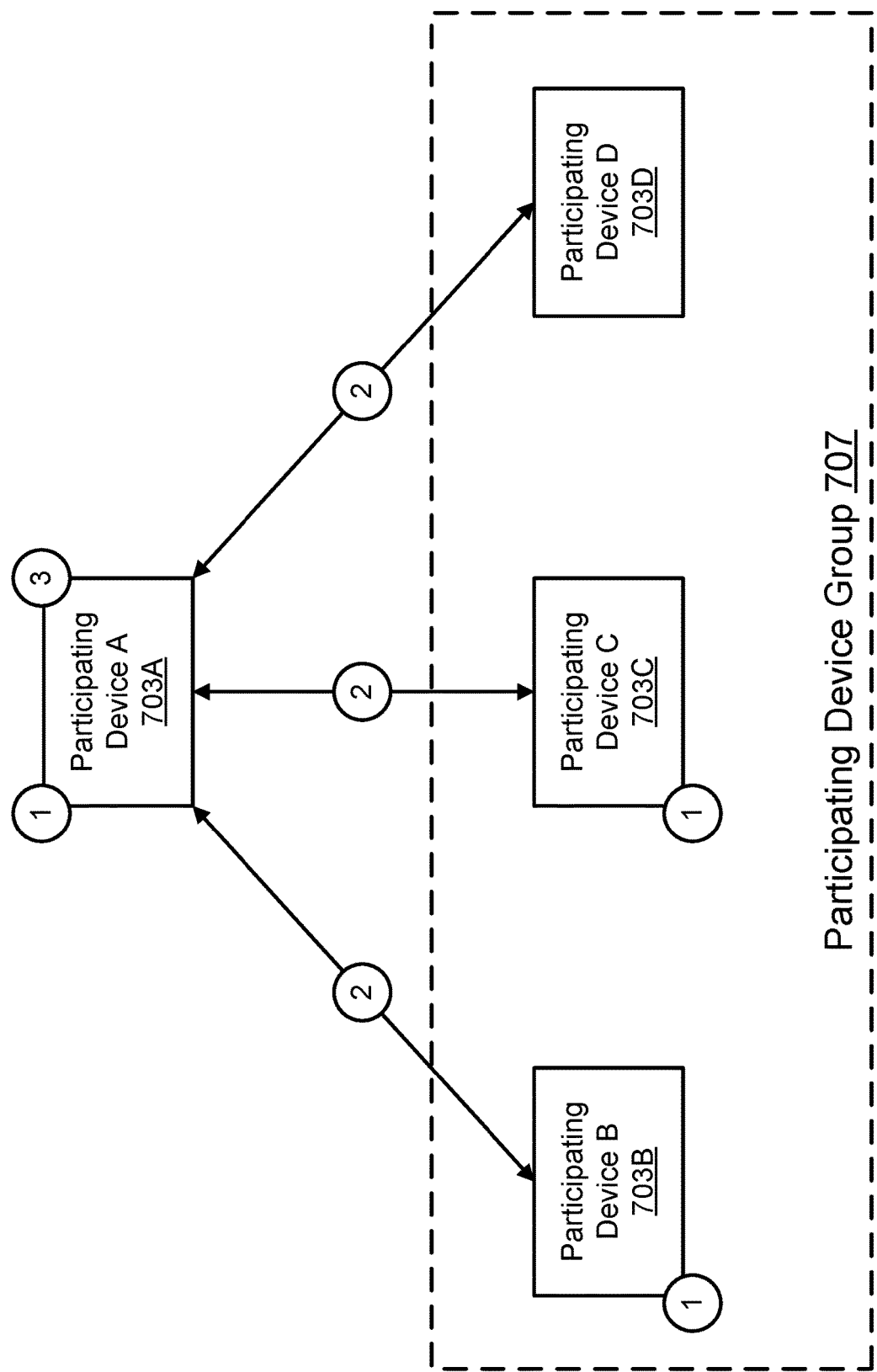
Figure 8A:
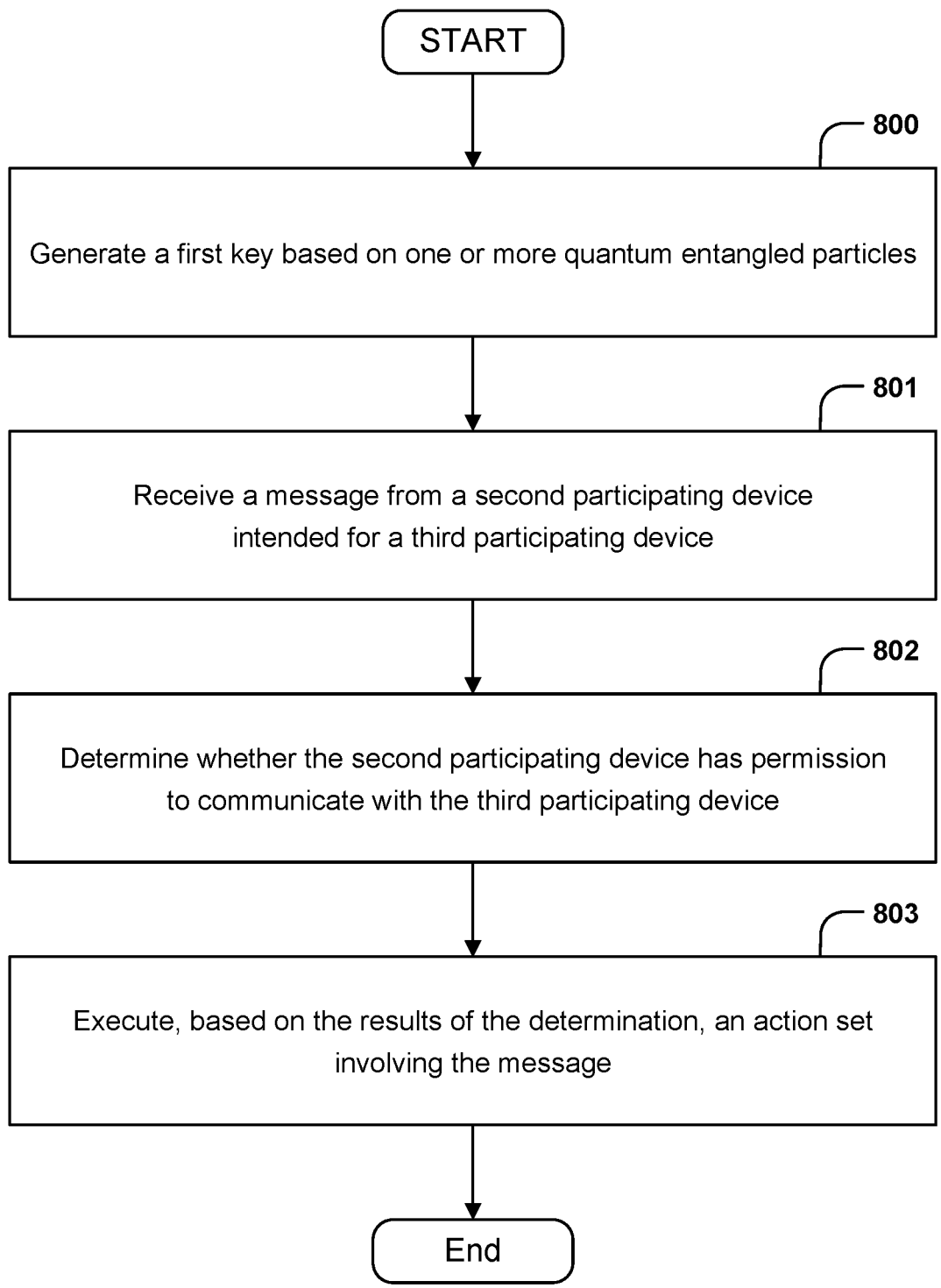
FIG. 8 illustrates a swim lane diagram with example operations that may be performed by components of the environment depicted in FIG. 1 for establishing shared cryptographic keys with three participating devices using entangled quantum particles, in accordance with some example embodiments described herein.
Figure 8B:
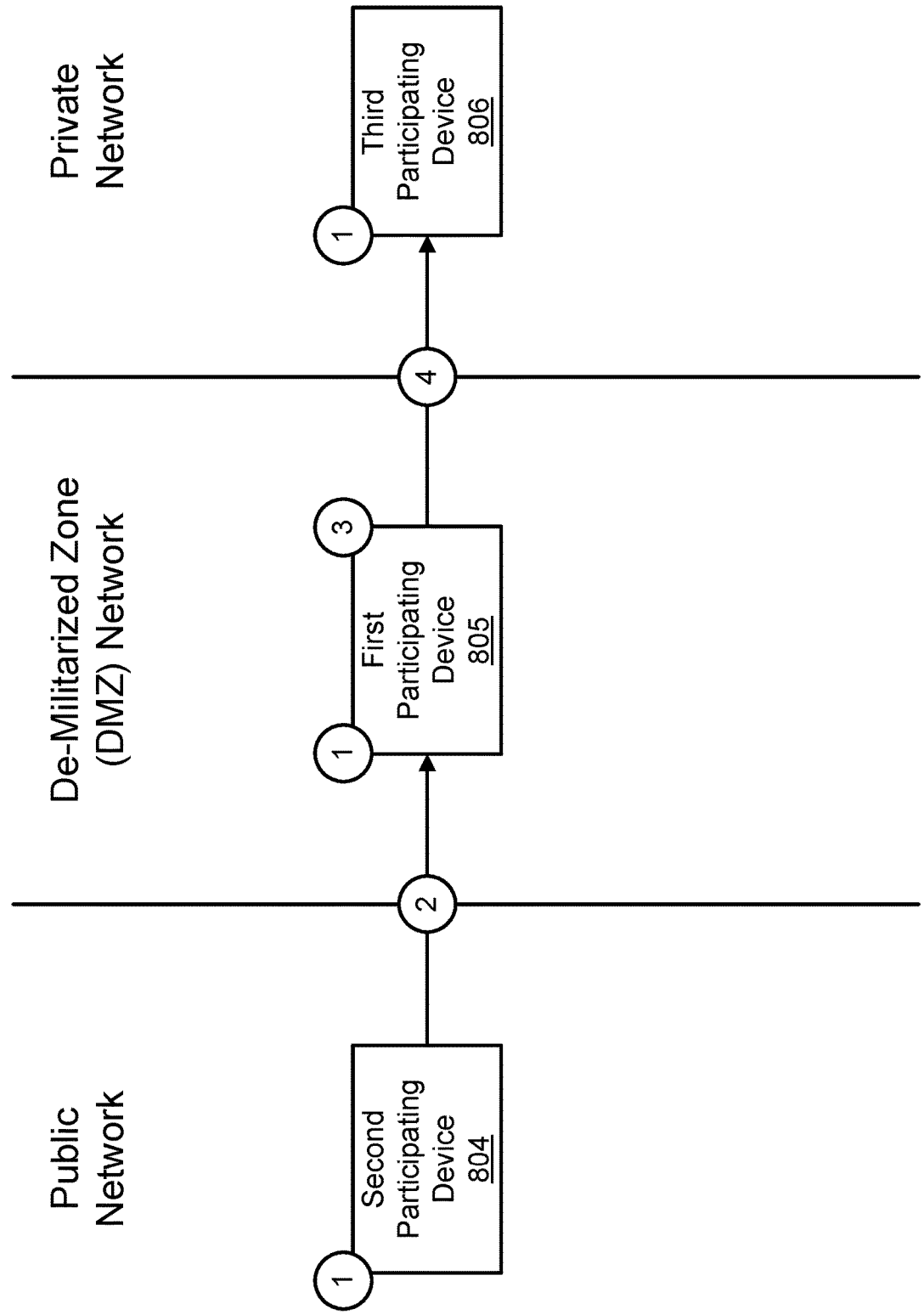

Turning next to FIG. 7, example operations are shown for establishing cryptographic keys based on a matching set of bits. In some embodiments, the operations described in connection with example operation 308 may be implemented in the way shown in FIG. 7. As shown by operation 702, the apparatus 200 includes means, such as processor 202, memory 204, communications hardware 206, cryptographic circuitry 214, or the like, for generating a symmetric key based on the matching set of bits. The symmetric key may be based on the matching set of bits, and may be derived in a deterministic way from the set of bits so that each of host devices 106-110 may derive the same shared key. As described above, the matching set of bits may include a number of bits designated as verification bits and a number of bits designated for establishing the cryptographic keys (e.g., the symmetric keys). In some embodiments, the verification bits may be discarded, and the symmetric key may be based on the remaining bits (e.g., the bits designated for establishing the cryptographic keys). In some embodiments, additional processing may be necessary, for example, if different subsets of bits are designated for establishing the secure communication channel with the host devices 106 and host device 108. In some embodiments, the intersection of the sets of bits used for establishing cryptographic keys may be used, and non-overlapping bits may be discarded. In this example, the cryptographic circuitry 214 may transmit the identity of the intersection of the various sets of bits for establishing secure communication to each of the host devices 106-110, as described below in connection with operation 704. In some embodiments, the cryptographic circuitry 214 may establish a symmetric key for each host device. It will be understood that the example methods described here for establishing the symmetric key are examples and other methods may be utilized to establish the symmetric keys based on different selections of verification bits and bits for establishing cryptographic keys.

As shown by operation 704, the apparatus 200 may include means, such as processor 202, memory 204, communications hardware 206, cryptographic circuitry 214, or the like, for transmitting auxiliary information for key generation to one or more of the host devices 106-110. In some embodiments, the cryptographic circuitry 214 may prepare auxiliary information including verification bits, a confirmation message, a test message, or the like to transmit to the other host devices. The communications hardware 206 may transmit the auxiliary information to complete the process of preparing the symmetric key. In some embodiments, the one or more host devices 106-110 may receive the auxiliary information and complete the procedure of generating an identical symmetric key to establish secure communication.

As shown by operation 706, the apparatus 200 may include means, such as processor 202, memory 204, communications hardware 206, cryptographic circuitry 214, or the like, for transmitting a message using the cryptographic keys. The cryptographic circuitry 214 may encrypt a message using the symmetric key and transmit via the communications hardware 206 to one or more of the host devices 106-110. Additionally, the cryptographic circuitry 214 may decrypt an encrypted message received from one or more of the host devices 106-110. Usage of the cryptographic keys may be one or more of any symmetric key cryptography, data encryption, data authentication (message authentication code, MAC, hash-based message authentication code, HMAC) or key encryption (key encryption key, KEK) to establish other keys. For example, KEK may be used after establishing cryptographic keys to establish other keys such as session keys.

In some embodiments, generating the symmetric key uses a key derivation function (KDF), where the matching set of bits is a seed (input) to the key derivation function. The KDF may be able to pad or stretch out a bit pattern to a longer key (without increasing the entropy of the key) or shorten a long bit pattern to a shorter key of the desired length, for example.

In some embodiments, the matching set of bits includes a pre-determined quantity of bits for verification and a pre-determined quantity of bits for establishing the cryptographic keys, where establishing the cryptographic keys is based on the pre-determined quantity of bits for establishing the cryptographic keys. For example, a string of bits "11001100" may be derived from a particle measurement. The length of the set of bits is set to 8, and the number of verification bits may be set to 3, for example. Supposing for example that the beginning of the string of bits is used to create the subset of bits for verification, the pre-determined quantity of first bits would be equal to "110," while the remaining bits "01100" would be reserved for establishing the cryptographic keys. The remaining bits "01100" may be provided as input to a KDF, or directly used as the shared key integer.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory include an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

FIG. 8 shows a swim lane diagram illustrating example operations (e.g., as described above in connection with FIGS. 3-8) performed by components of the environment depicted in FIG. 1 to produce various benefits of the implementations described herein. The operations shown in the swim lane diagram performed by a first host device (e.g., host device 106) are shown along the line extending from the box labeled "Victor," or host device 806, operations performed by a second host device (e.g., host device 108) are shown along the line extending from the box labeled "Alice," or host device 808 and operations performed by a first host device (e.g., host device 106) are shown along the line extending from the box labeled "Bob," or host device 810. Operations impacting multiple devices, such as data transmissions between the devices, are shown using arrows extending between these lines or boxes encompassing more than one of these lines. Generally, these operations are ordered temporally with respect to one another. However, it will be appreciated that the operations may be performed in other orders from those illustrated in FIG. 8.

At operation 820, host device 810 may generate a set of particles (e.g., according to example operation 302). At operation 822, host device 810 may generate an entangled particle triplet based on the set of particles (e.g., according to example operation 304). At operation 823, the entangled particles may be transmitted to the host devices 806-810 (e.g., according to example operation 306). At operation 824, the host devices 806-810 may derive sets of bits from the entangled particles and determine that the sets of bits match, described in further detail in connection with FIGS. 4-6 and example operation 308. Finally, at operation 826, cryptographic keys may be established based on the matching sets of bits, for example, in accordance with FIG. 7 and example operation 312.

CONCLUSION

As described above, example embodiments provide methods and apparatuses that enable improved authentication between multiple devices using N-way entangled particles. N-way entangled particles may be distributed to any number of devices within a distributed system. By doing so, a plurality of devices may be authenticated to participate in secure communications and, therefore, improve network security (e.g., by implementing a failover processes).

As these examples all illustrate, example embodiments contemplated herein provide technical solutions that solve real-world problems faced during transmission of data between devices in a distributed network. And while securing the exchange of sensitive information has been an issue for decades, the easier access to communication networks made available by recently emerging technology today has made this problem significantly more acute, which results in a more significant demand for quantum-based data security solutions. At the same time, recent advancements in entangled particle generation processes have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for establishing cryptographic keys shared among three or more devices, the method comprising:
   receiving, by communications hardware, a first set of bits from a first host device, wherein the first set of bits is derived from a first set of entangled particles by the first host device;
   making a determination, by cryptographic circuitry, whether the first set of bits, a second set of bits, and a third set of bits are matching sets of bits, wherein the first set of bits is derived from the first set of entangled particles by the first host device, the second set of bits is derived from a second set of entangled particles by a second host device, and the third set of bits is derived from a third set of entangled particles by a third host device;
   in an instance in which the first set of bits, the second set of bits, and the third set of bits are determined to be matching sets of bits, establishing, by the cryptographic circuitry, the cryptographic keys based on the matching sets of bits; and
   transmitting, by the communications hardware and to the first host device or the second host device, first encrypted data, wherein the first encrypted data is encrypted using a first cryptographic key of the cryptographic keys.

2. The method of claim 1, further comprising:
   generating, by quantum particle generator circuitry, a set of particles;
   generating, by quantum trisection circuitry and based on the set of particles, a set of entangled particle triplets comprising the first set of entangled particles, the second set of entangled particles, and the third set of entangled particles; and
   transmitting, by a quantum communications channel, the first set of entangled particles to the first host device, the second set of entangled particles to the second host device, and the third set of entangled particles to the third host device.

3. The method of claim 2, wherein the quantum particle generator circuitry is a component of the first host device.

4. The method of claim 2, wherein the quantum trisection circuitry is a component of the first host device.

5. The method of claim 2, wherein a hardware security module comprises the quantum particle generator circuitry and the quantum trisection circuitry.

6. The method of claim 1, wherein making the determination whether the first set of bits, the second set of bits, and the third set of bits are matching sets of bits comprises:
   receiving, by the communications hardware, a pre-determined quantity of second bits from the second host device, wherein the second set of bits comprises the pre-determined quantity of second bits;
   receiving, by the communications hardware, a pre-determined quantity of third bits from the third host device, wherein the third set of bits comprises the pre-determined quantity of third bits;
   making a determination, by the cryptographic circuitry, whether the pre-determined quantity of second bits is identical to the pre-determined quantity of third bits; and
   making a determination, by the cryptographic circuitry, whether the pre-determined quantity of third bits is identical to a pre-determined quantity of first bits, wherein the first set of bits comprises the pre-determined quantity of first bits.

7. The method of claim 1, wherein making the determination whether the first set of bits, the second set of bits, and the third set of bits are matching sets of bits comprises:
   receiving, by the communications hardware, a pre-determined quantity of third bits from the third host device, wherein the third set of bits comprises the pre-determined quantity of third bits;
   making a determination, by the cryptographic circuitry, whether the pre-determined quantity of third bits is identical to a pre-determined quantity of first bits, wherein the first set of bits comprises the pre-determined quantity of first bits;
   providing, by the communications hardware, the pre-determined quantity of first bits to the second host device;
   receiving, by the communications hardware and from the second host device, an indication that the pre-determined quantity of first bits and a pre-determined quantity of second bits are identical, wherein the second set of bits comprises the pre-determined quantity of second bits; and
   providing, by the communications hardware and to the third host device and second host device, an indication that the third set of bits, the second set of bits, and the third set of bits are matching sets of bits.

8. The method of claim 1, wherein making the determination whether the first set of bits, the second set of bits, and the third set of bits are matching sets of bits comprises:
   providing, by the communications hardware, a pre-determined quantity of first bits to the second host device, wherein the first set of bits comprises the pre-determined quantity of first bits; and providing, by the communications hardware, the pre-determined quantity of first bits to the third host device.

9. The method of claim 8, wherein making the determination whether the first set of bits, the second set of bits, and the third set of bits are matching sets of bits further comprises:

receiving, by the communications hardware and from the second host device, an indication that the pre-determined quantity of first bits is identical to a pre-determined quantity of second bits; and receiving, by the communications hardware and from the third host device, an indication that the pre-determined quantity of first bits is identical to a pre-determined quantity of third bits.

10. The method of claim 1, wherein establishing the cryptographic keys comprises:

generating, by the cryptographic circuitry, a symmetric key based on the matching sets of bits; and receiving, by the communications hardware and from a remote device, an indication that a matching symmetric key is generated.

11. The method of claim 10, wherein generating the symmetric key uses a key derivation function, wherein the matching sets of bits are inputs to the key derivation function.

12. The method of claim 1, wherein establishing the cryptographic keys is based on a pre-determined quantity of bits for establishing the cryptographic keys.

13. The method of claim 1, wherein a hardware security module comprises the cryptographic circuitry.

14. The method of claim 1, further comprising:

making a measurement, by the cryptographic circuitry, of a first entangled particle; and determining, by the cryptographic circuitry, the first set of bits based on the measurement of the first entangled particle.

15. An apparatus for establishing cryptographic keys shared among three or more devices, the apparatus comprising:

communications hardware configured to receive a first set of bits from a first host device, wherein the first set of bits is derived from a first set of entangled particles by the first host device; and cryptographic circuitry configured to:

make a determination whether the first set of bits, a second set of bits, and a third set of bits are matching sets of bits, wherein the first set of bits is derived from the first set of entangled particles by the first host device, the second set of bits is derived from a second set of entangled particles by a second host device, and the third set of bits is derived from a third set of entangled particles by a third host device, and in an instance in which the first set of bits, the second set of bits, and the third set of bits are determined to be matching sets of bits, establishing the cryptographic keys based on the matching sets of bits, wherein the communications hardware is further configured to transmit first encrypted data to the first host device or the second host device, wherein the first encrypted data is encrypted using a first cryptographic key of the cryptographic keys.

16. The apparatus of claim 15, further comprising:

particle generator circuitry configured to generate a set of particles;

quantum trisection circuitry configured to generate, based on the set of particles, a set of entangled particle triplets comprising the first set of entangled particles, the second set of entangled particles, and the third set of entangled particles; and a quantum communications channel configured to transmit the first set of entangled particles to the first host device, the second set of entangled particles to the second host device, and the third set of entangled particles to the third host device.

17. The apparatus of claim 15, wherein the cryptographic circuitry is further configured so that making the determination whether the first set of bits, the second set of bits, and the third set of bits are matching sets of bits comprises:

receiving a pre-determined quantity of second bits from the second host device, wherein the second set of bits comprises the pre-determined quantity of second bits;

receiving a pre-determined quantity of third bits from the third host device, wherein the third set of bits comprises the pre-determined quantity of third bits;

making a determination whether the pre-determined quantity of second bits is identical to the pre-determined quantity of third bits; and making a determination whether the pre-determined quantity of third bits is identical to a pre-determined quantity of first bits, wherein the first set of bits comprises the pre-determined quantity of first bits.

18. An apparatus for establishing a secure communications channel between two or more devices, the apparatus comprising:

means for receiving a first set of bits from a first host device, wherein the first set of bits is derived from a first set of entangled particles by the first host device;

means for making a determination whether the first set of bits, a second set of bits, and a third set of bits are matching sets of bits, wherein the first set of bits is derived from the first set of entangled particles by the first host device, the second set of bits is derived from a second set of entangled particles by a second host device, and the third set of bits is derived from a third set of entangled particles by a third host device;

means for, in an instance in which the first set of bits, the second set of bits, and the third set of bits are determined to be matching sets of bits, establishing the secure communications channel based on matching sets of bits; and means for transmitting, using the secure communications channel and to the first host device or the second host device, first encrypted data.

19. The apparatus of claim 18, further comprising:

means for generating a set of particles;

means for generating, based on the set of particles, an set of entangled particle triplets comprising the first set of entangled particles, the second set of entangled particles, and the third set of entangled particles; and means for transmitting the first set of entangled particles to a first host device, the second set of entangled particles to a second host device, and the third set of entangled particles to a third host device.

20. The apparatus of claim 18, wherein making the determination whether the first set of bits, the second set of bits, and the third set of bits are matching sets of bits comprises:

receiving a pre-determined quantity of second bits from the second host device, wherein the second set of bits comprises the pre-determined quantity of second bits;

receiving a pre-determined quantity of third bits from the third host device, wherein the third set of bits comprises the pre-determined quantity of third bits;

making a determination whether the pre-determined quantity of second bits is identical to the pre-determined quantity of third bits; and making a determination whether the pre-determined quantity of third bits is identical to a pre-determined quantity of first bits, wherein the first set of bits comprises the pre-determined quantity of first bits.

* * * * *